(12) United States Patent
Tanabe et al.

(10) Patent No.: US 11,042,029 B2
(45) Date of Patent: Jun. 22, 2021

(54) DISPLAY DEVICE, OBJECT APPARATUS, IMAGE FORMING UNIT AND DISPLAY METHOD

(71) Applicants: Hiroyuki Tanabe, Tokyo (JP); Yumiko Kishi, Kanagawa (JP); Makoto Inamoto, Ishikawa (JP)

(72) Inventors: Hiroyuki Tanabe, Tokyo (JP); Yumiko Kishi, Kanagawa (JP); Makoto Inamoto, Ishikawa (JP)

(73) Assignee: Ricoh Company, Ltd., Tokyo (JP)

( * ) Notice: Subject to any disclaimer, the term of this patent is extended or adjusted under 35 U.S.C. 154(b) by 196 days.

(21) Appl. No.: 16/475,496

(22) PCT Filed: Mar. 14, 2018

(86) PCT No.: PCT/JP2018/010035
§ 371 (c)(1),
(2) Date: Jul. 2, 2019

(87) PCT Pub. No.: WO2018/168951
PCT Pub. Date: Sep. 20, 2018

(65) Prior Publication Data
US 2019/0346677 A1 Nov. 14, 2019

(30) Foreign Application Priority Data

Mar. 17, 2017 (JP) .............................. JP2017-053554
Jan. 15, 2018 (JP) .............................. JP2018-004108

(51) Int. Cl.
*G02B 26/08* (2006.01)
*G02B 27/01* (2006.01)
(Continued)

(52) U.S. Cl.
CPC ....... *G02B 27/0101* (2013.01); *G02B 3/0056* (2013.01); *G02B 26/105* (2013.01);
(Continued)

(58) Field of Classification Search
CPC ............. G02B 27/0101; G02B 3/0056; G02B 26/105; G02B 2027/014; G02B 2027/011;
(Continued)

(56) References Cited

U.S. PATENT DOCUMENTS 8,760,766 B2 6/2014 Fujikawa
9,158,124 B2 10/2015 Saisho et al.
(Continued)

FOREIGN PATENT DOCUMENTS

EP 3088923 11/2016
EP 3104212 12/2016
(Continued)

OTHER PUBLICATIONS

International Search Report dated May 25, 2018 in PCT/JP2018/010035 filed on Mar. 14, 2018.
(Continued)

*Primary Examiner* — Euncha P Cherry
(74) *Attorney, Agent, or Firm* — IPUSA, PLLC

(57) ABSTRACT

A display device includes a light source unit, a light deflector configured to deflect light from the light source unit, an optical element array configured to be two-dimensionally scanned in a main-scanning direction and in a sub-scanning direction with light via the light deflector 15, the optical element array having a plurality of optical elements, and a light projecting unit configured to project light received via the optical element array. In the display device, each of a beam spot diameter in the sub-scanning direction on the optical element array and an arrangement pitch of the optical elements in the sub-scanning direction on the optical element array is equal to or greater than a scanning line pitch on the optical element array.

11 Claims, 24 Drawing Sheets

(51) Int. Cl.
  *G02B 3/00* (2006.01)
  *G02B 26/10* (2006.01)
(52) U.S. Cl.
  CPC .... *G02B 26/0833* (2013.01); *G02B 2027/011* (2013.01); *G02B 2027/014* (2013.01); *G02B 2027/0112* (2013.01); *G02B 2027/0145* (2013.01)
(58) Field of Classification Search
  CPC ........ G02B 2027/0112; G02B 26/0833; G02B 2027/0145; G02B 27/14; G02B 27/0905; G02B 26/0858; G02B 26/101
  USPC ...................................................... 359/197.1
  See application file for complete search history.

(56) References Cited

U.S. PATENT DOCUMENTS

| | | | |
|---|---|---|---|
| 9,436,008 B2 | 9/2016 | Fujikawa et al. | |
| 9,746,669 B2 | 8/2017 | Saisho et al. | |
| 9,798,140 B2 | 10/2017 | Inamoto et al. | |
| 9,997,093 B2 | 6/2018 | Atsuumi et al. | |
| 10,031,343 B2 | 7/2018 | Saisho et al. | |
| 2009/0161191 A1 | 6/2009 | Powell | |
| 2014/0177022 A1* | 6/2014 | Saisho | G02B 3/04 359/205.1 |
| 2015/0219803 A1 | 8/2015 | Inamoto et al. | |
| 2016/0320615 A1 | 11/2016 | Nakamura et al. | |
| 2017/0315353 A1 | 11/2017 | Saisho et al. | |

FOREIGN PATENT DOCUMENTS

| | | |
|---|---|---|
| JP | 2013-200434 | 10/2013 |
| JP | 5310810 | 10/2013 |
| JP | 2014-139656 | 7/2014 |
| JP | 2014-170213 | 9/2014 |

OTHER PUBLICATIONS

Kenji Kagitani, Makoto Hino and Susumu Imakawa, Advanced Technology Development Center, Ricoh Co., Ltd. Yokohama, Japan "Image Noise Evaluation Method for Color Hardcopy", pp. 1-7.

* cited by examiner

[Fig. 1]
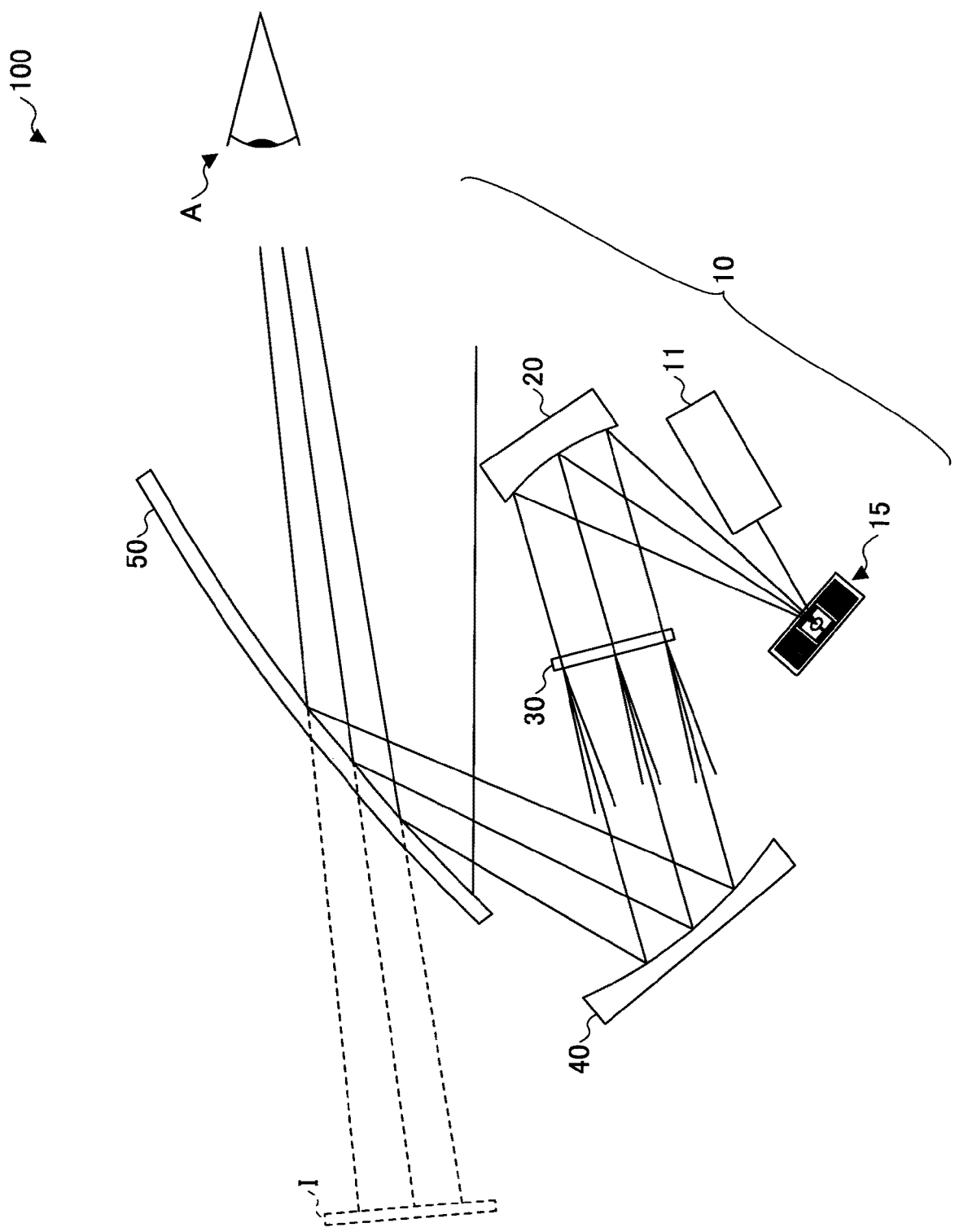

[Fig. 2]
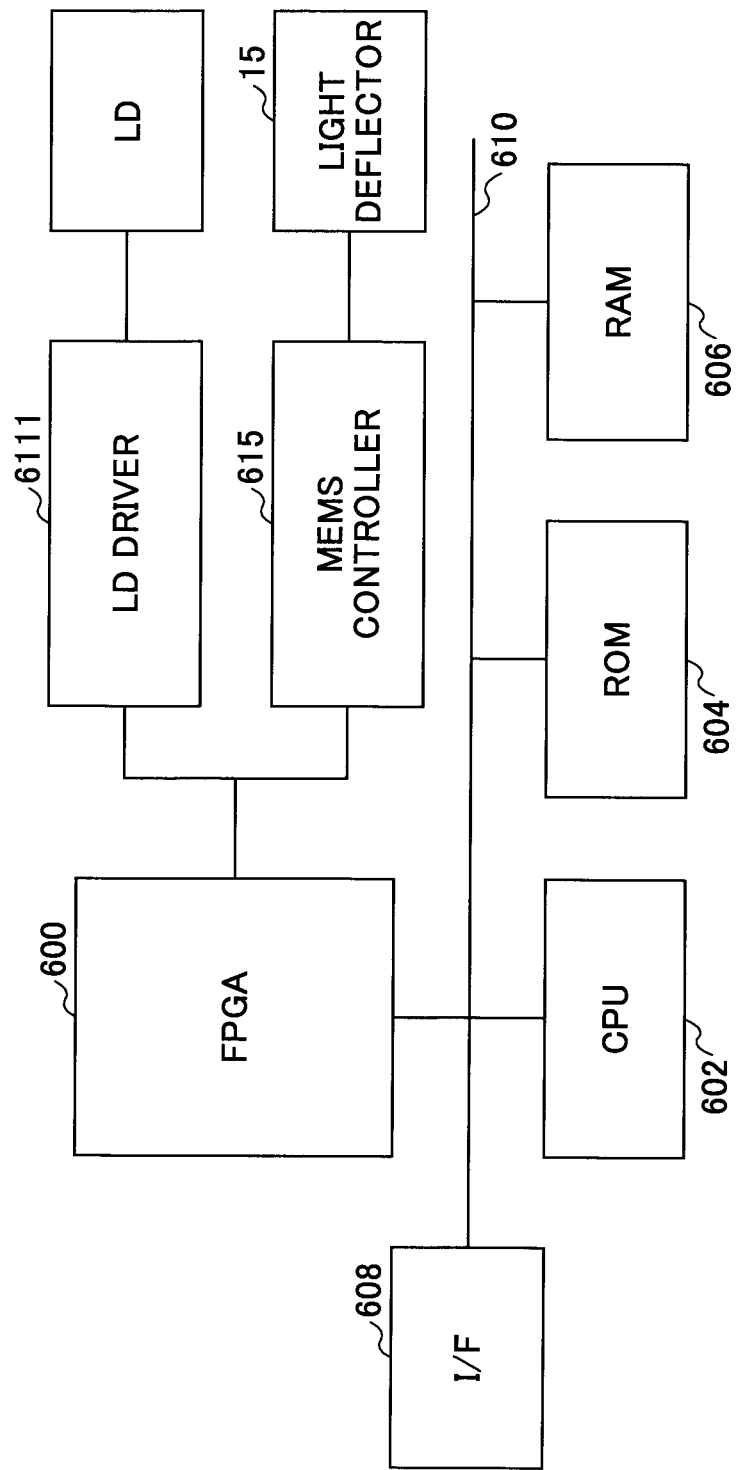

[Fig. 3]
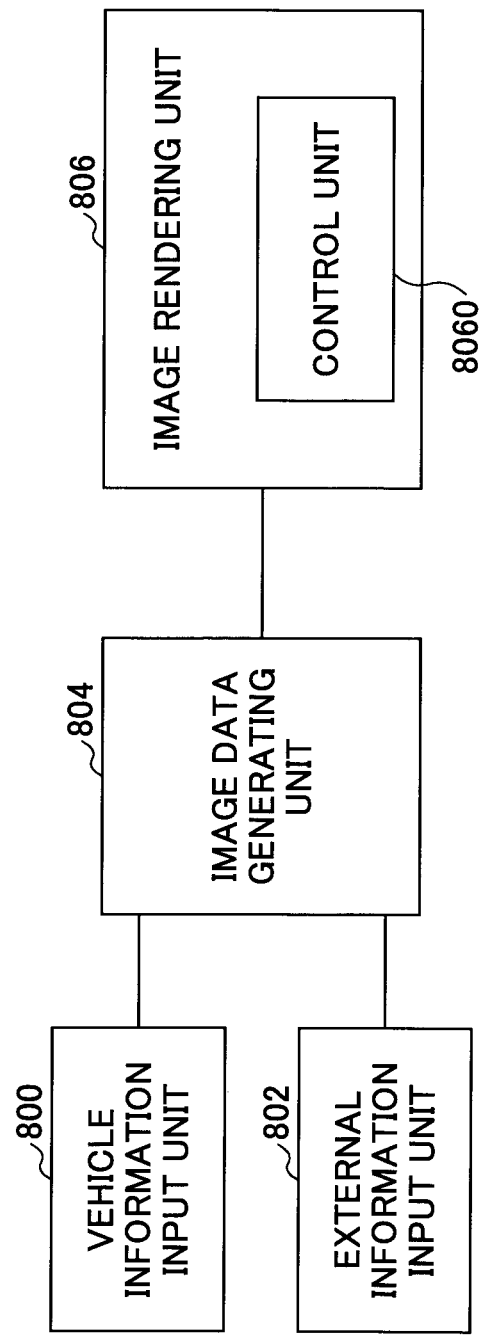

[Fig. 4]
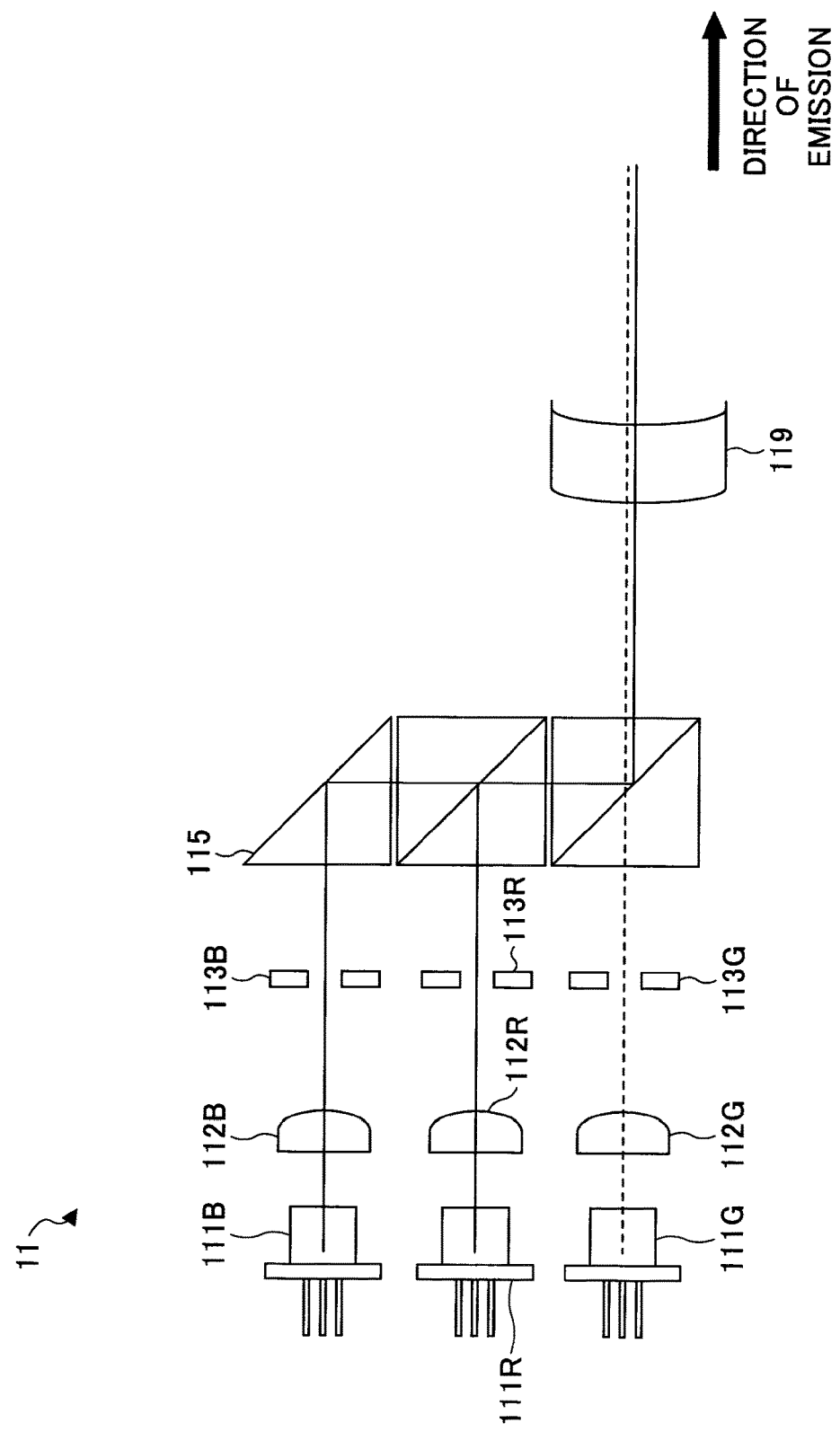

[Fig. 5]
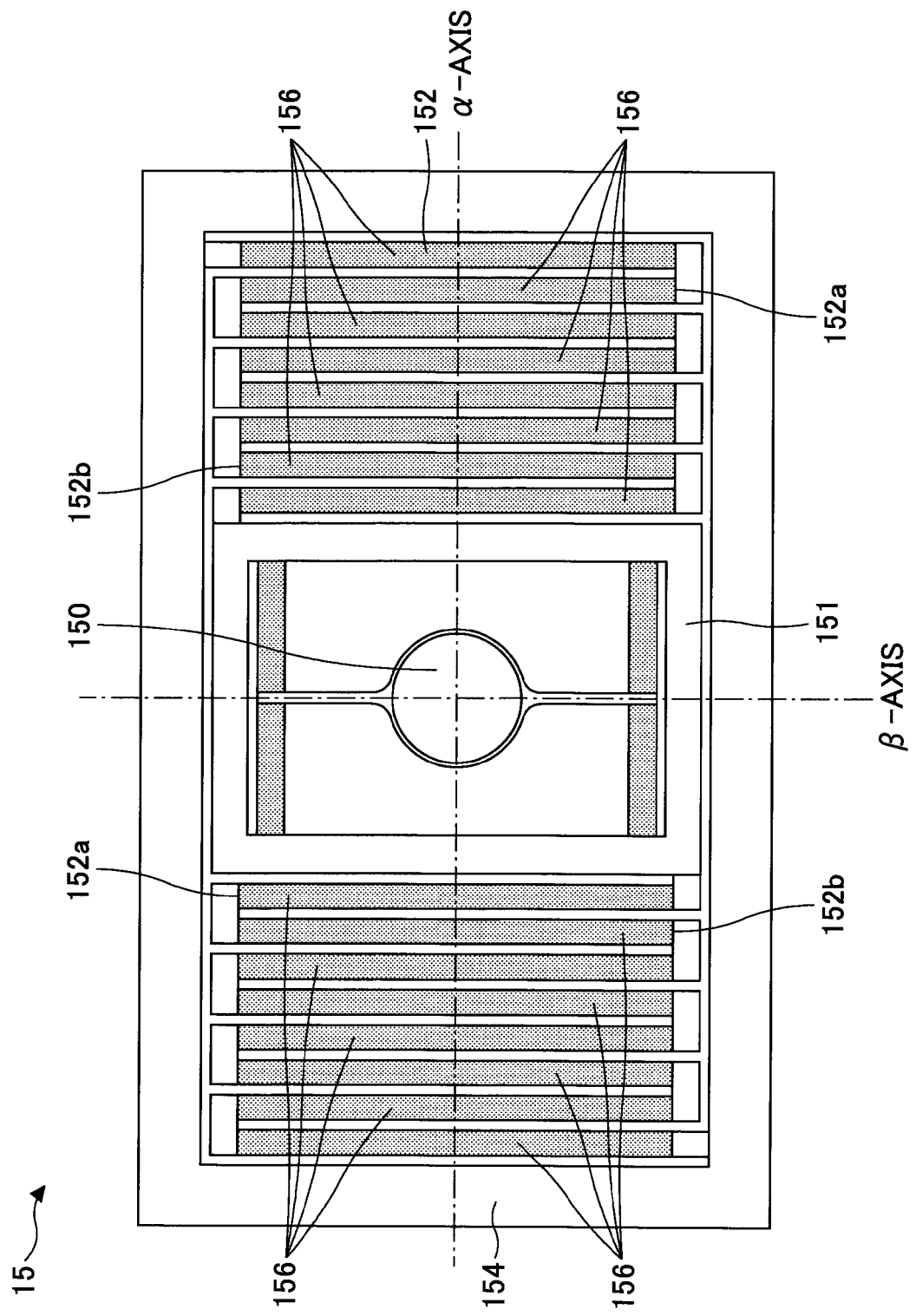

[Fig. 6]
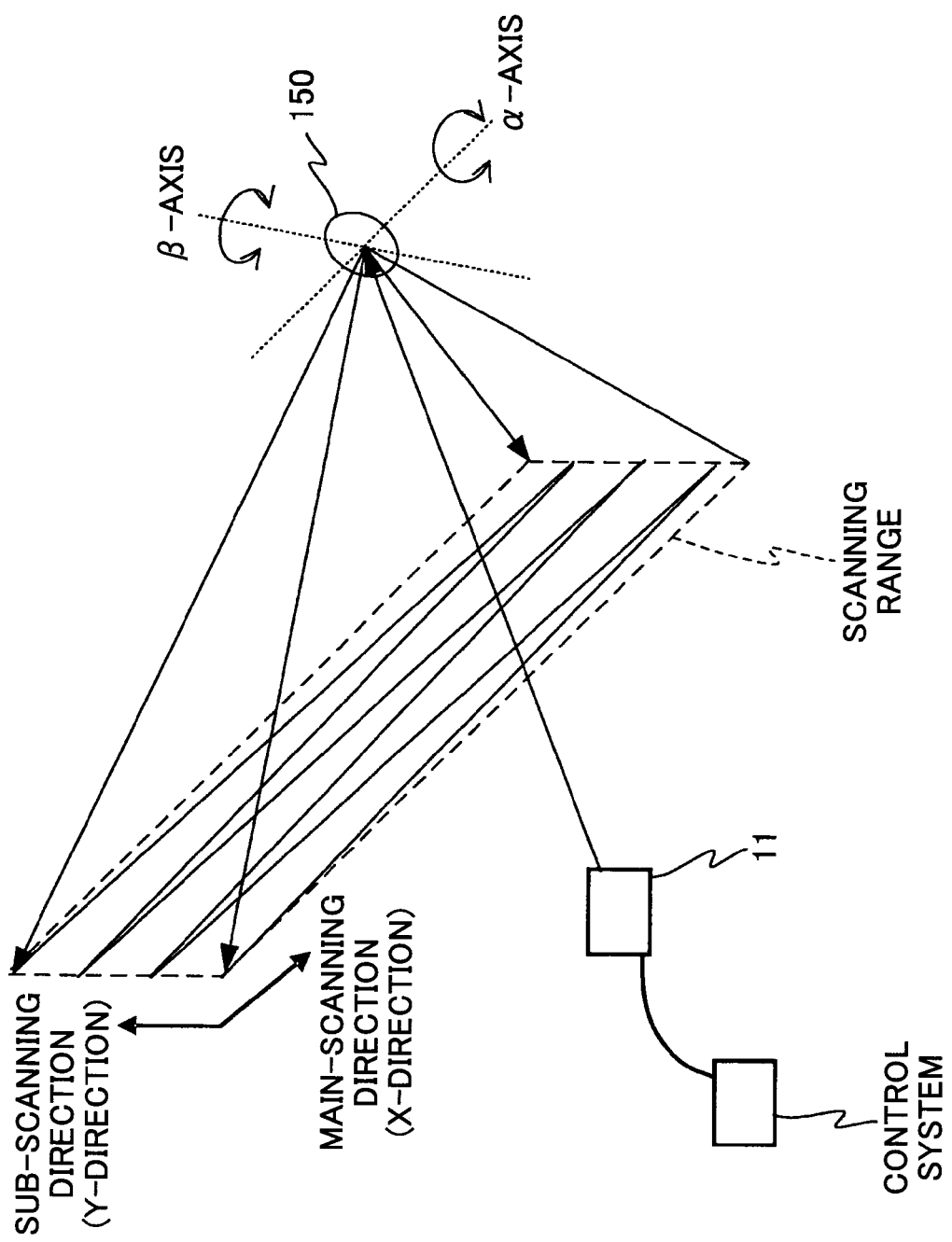

[Fig. 7]
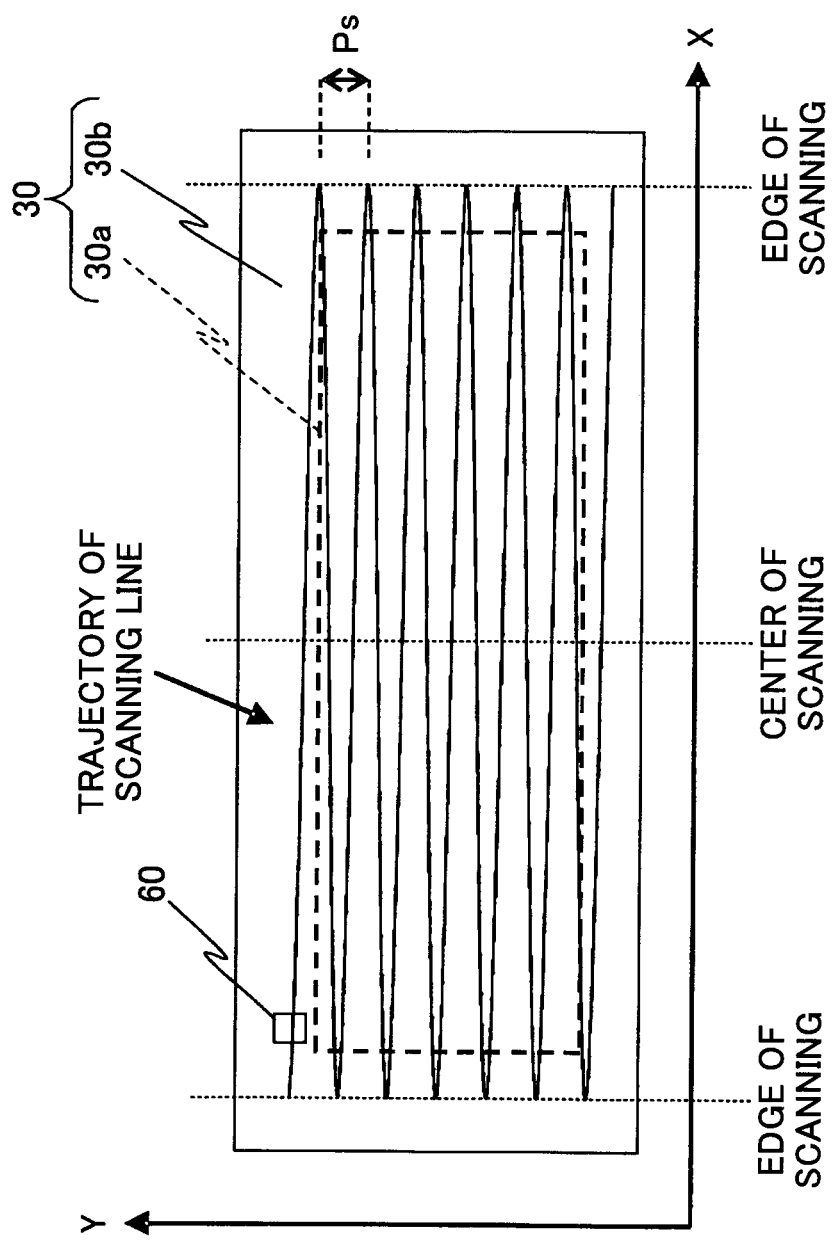

[Fig. 8A]
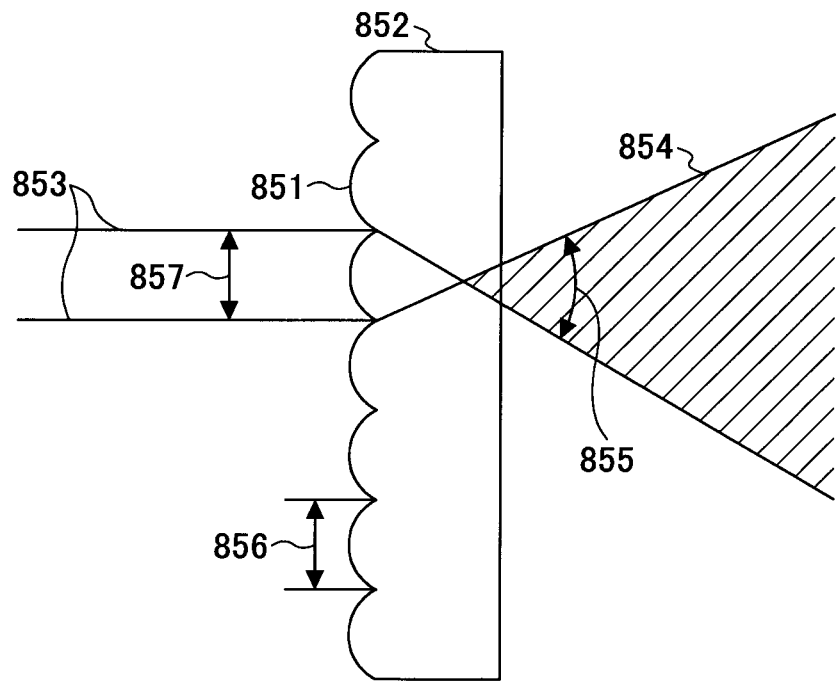
[Fig. 8B]
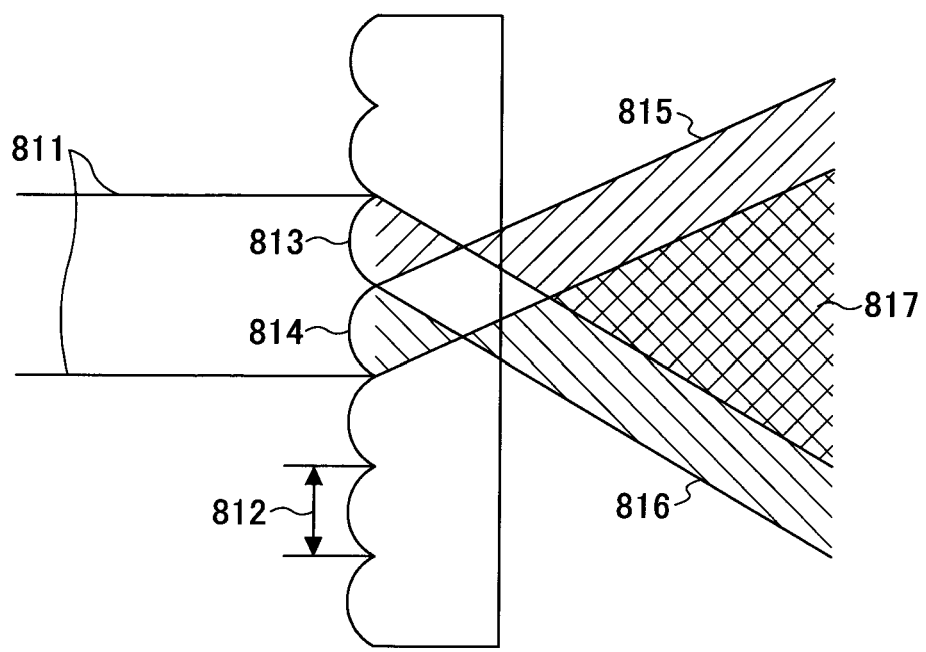

[Fig. 9]
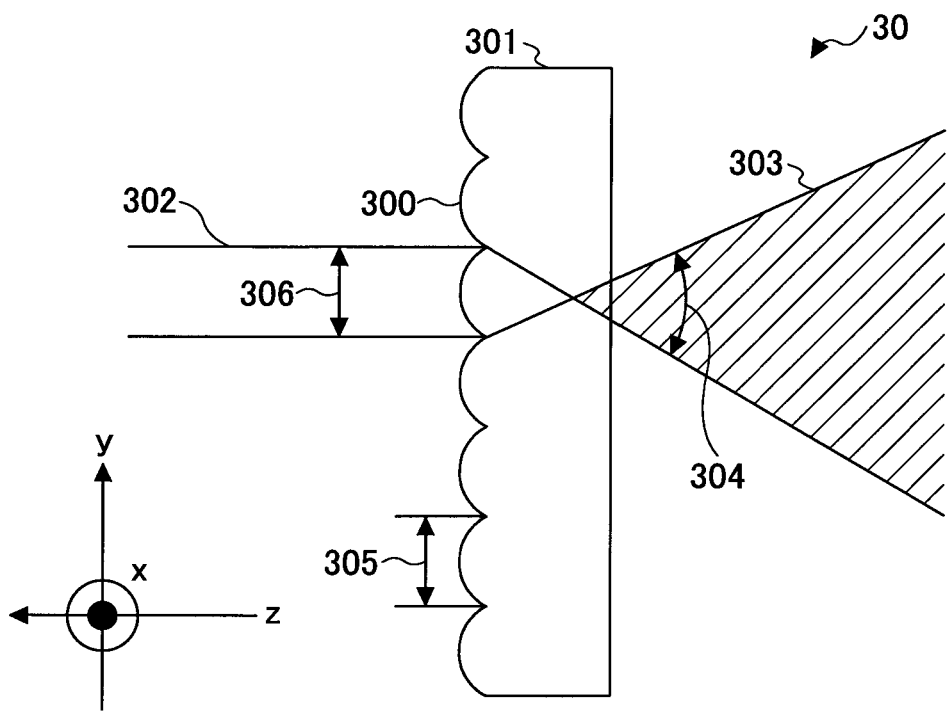
[Fig. 10]
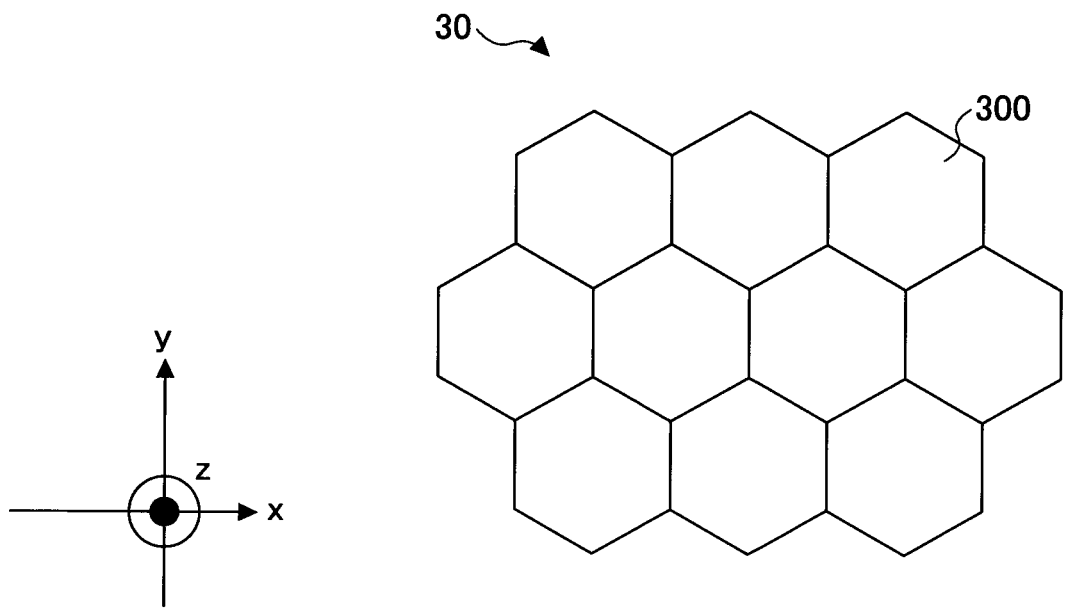

[Fig. 11A]
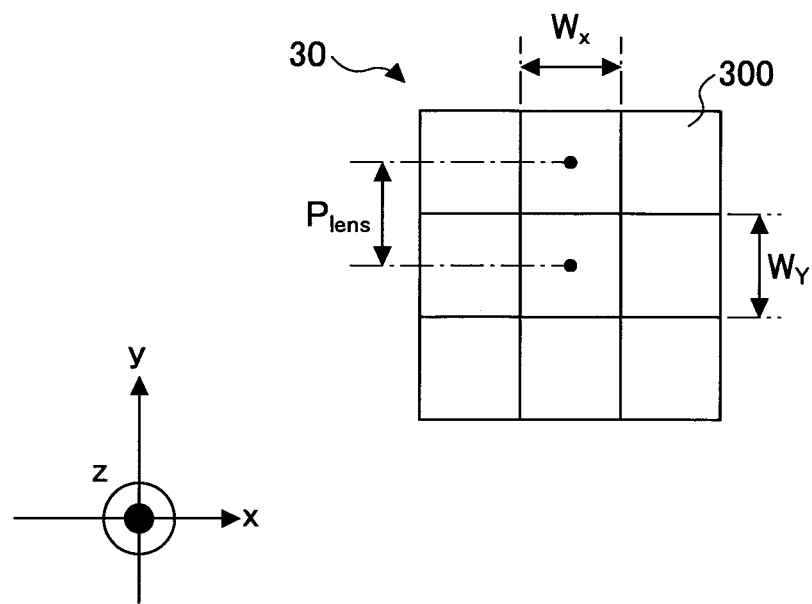
[Fig. 11B]
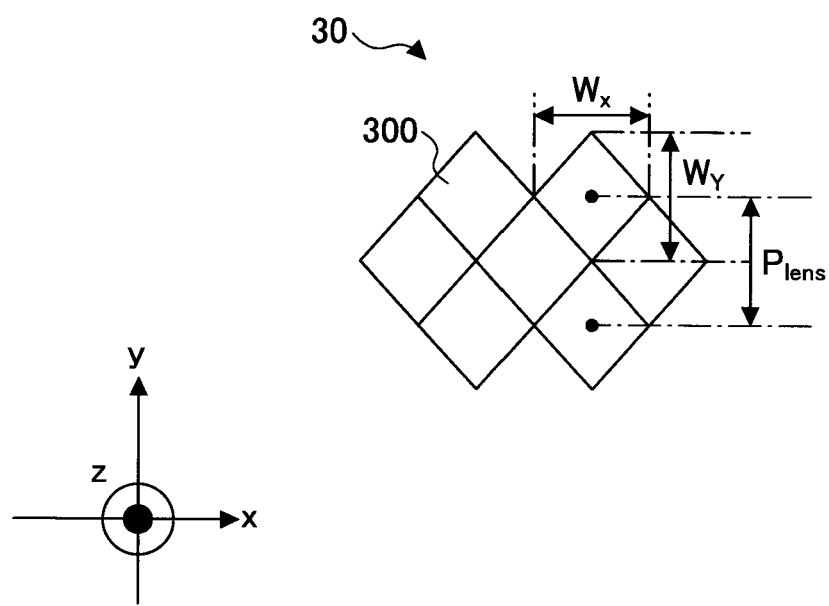

[Fig. 11C]
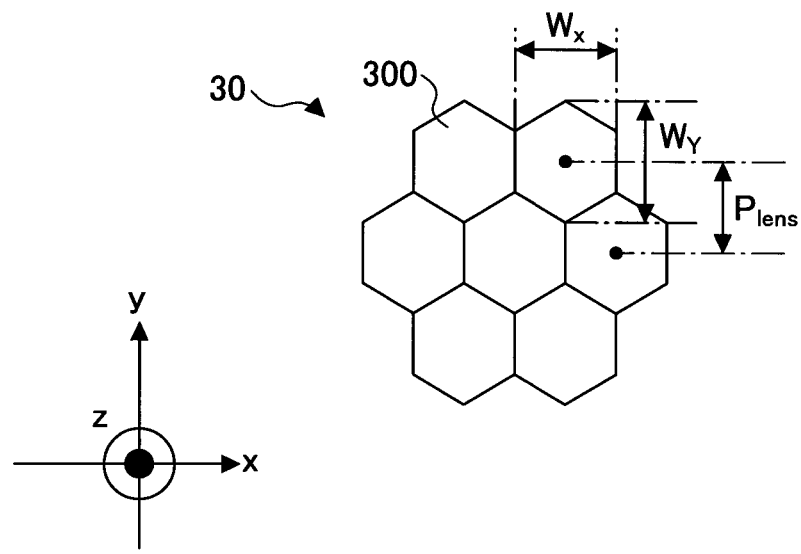
[Fig. 11D]
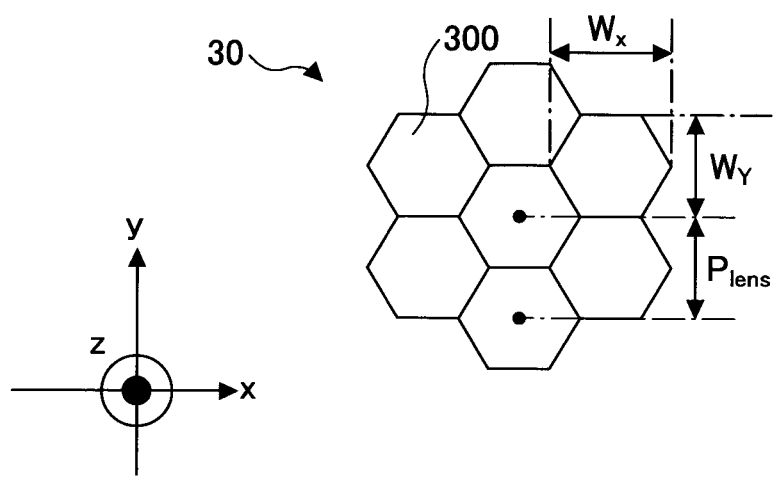

[Fig. 12]
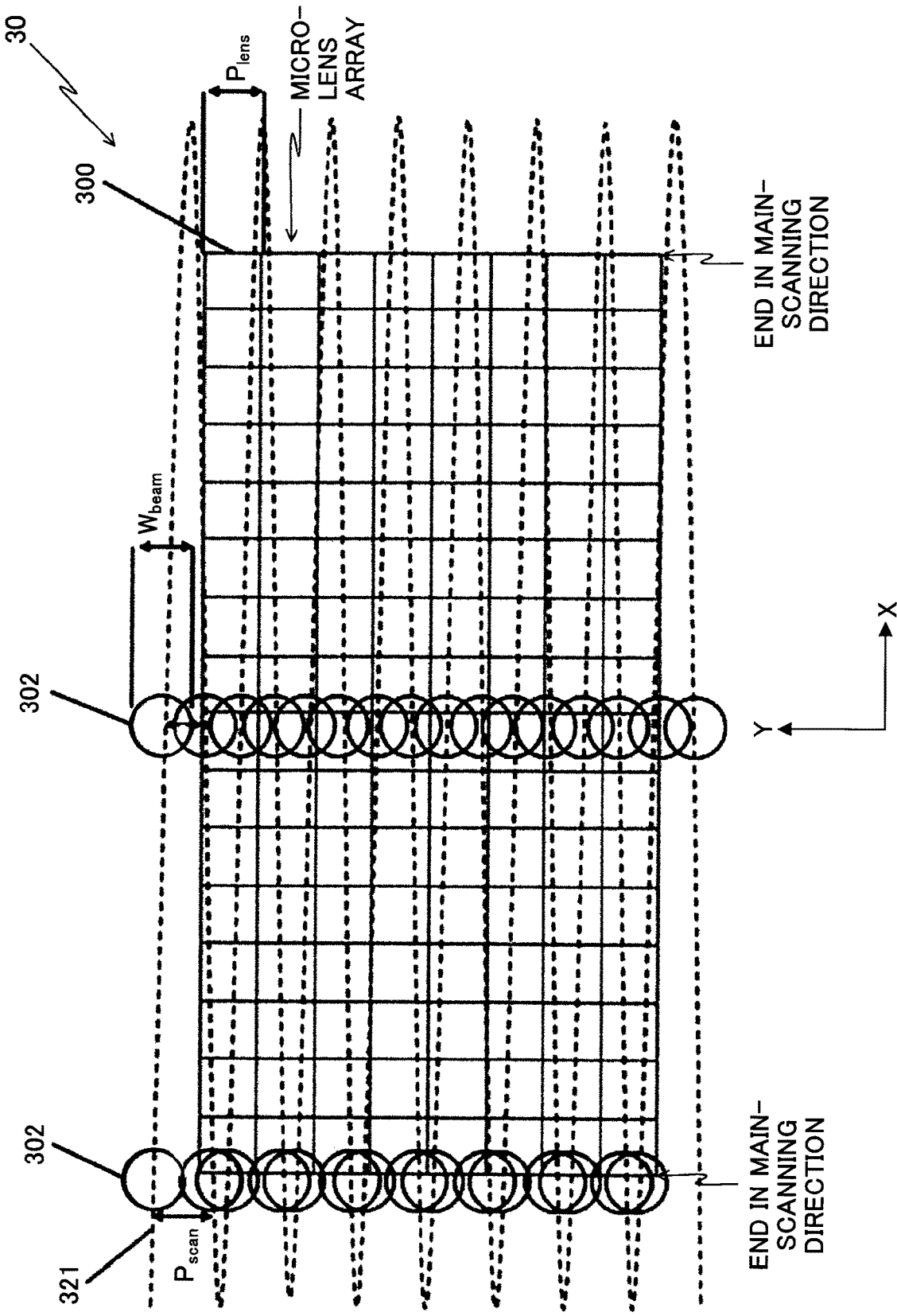

[Fig. 13]
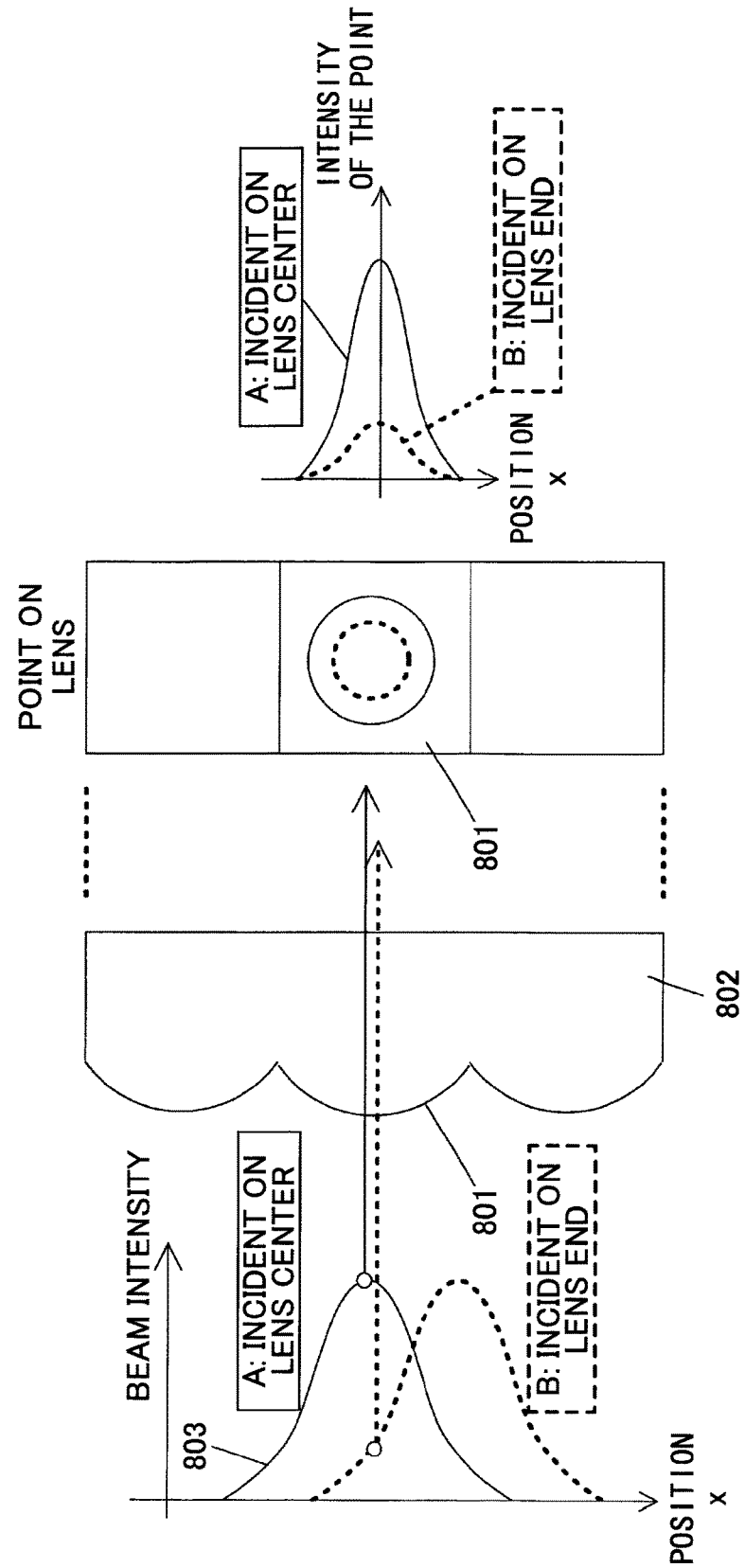

[Fig. 14A]
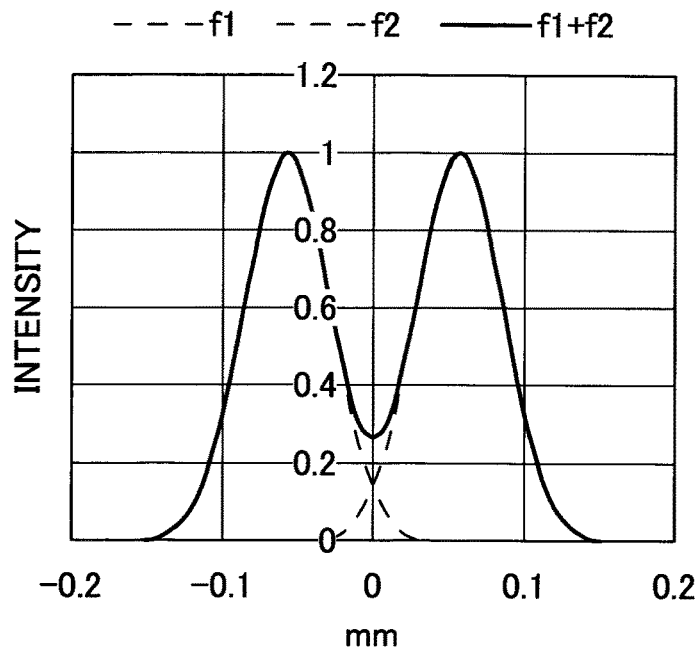
[Fig. 14B]
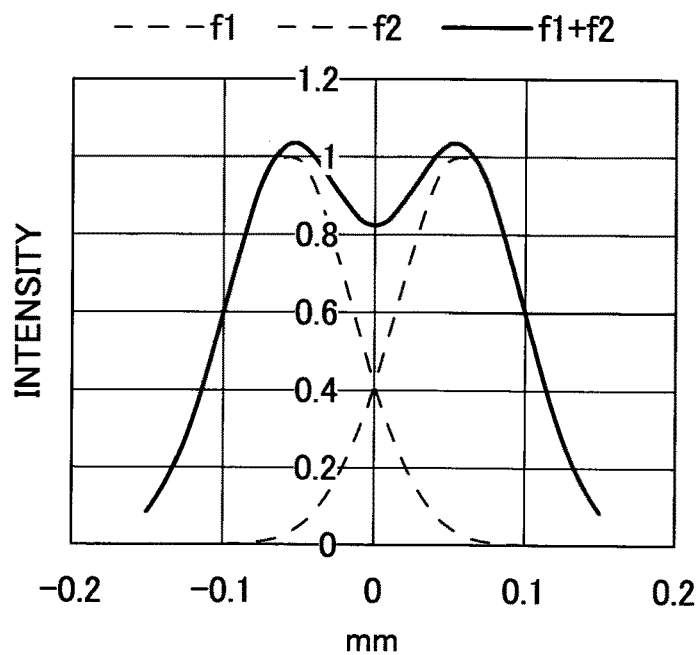

[Fig. 14C]
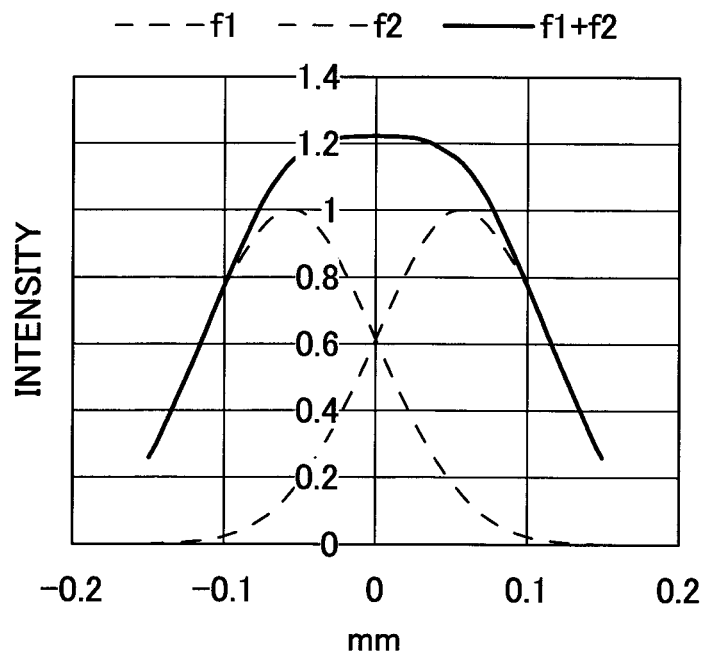
[Fig. 15]
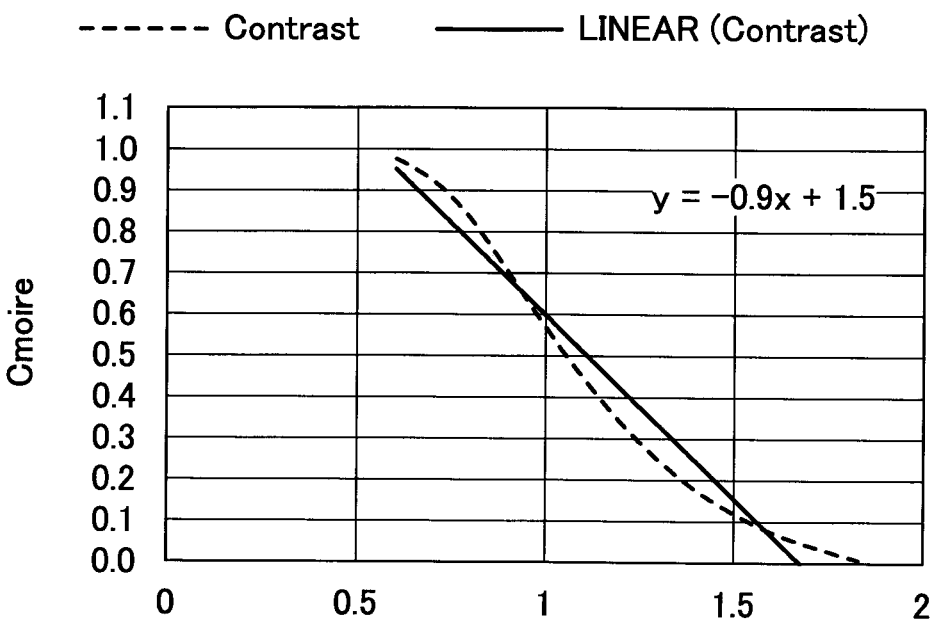

[Fig. 16A]
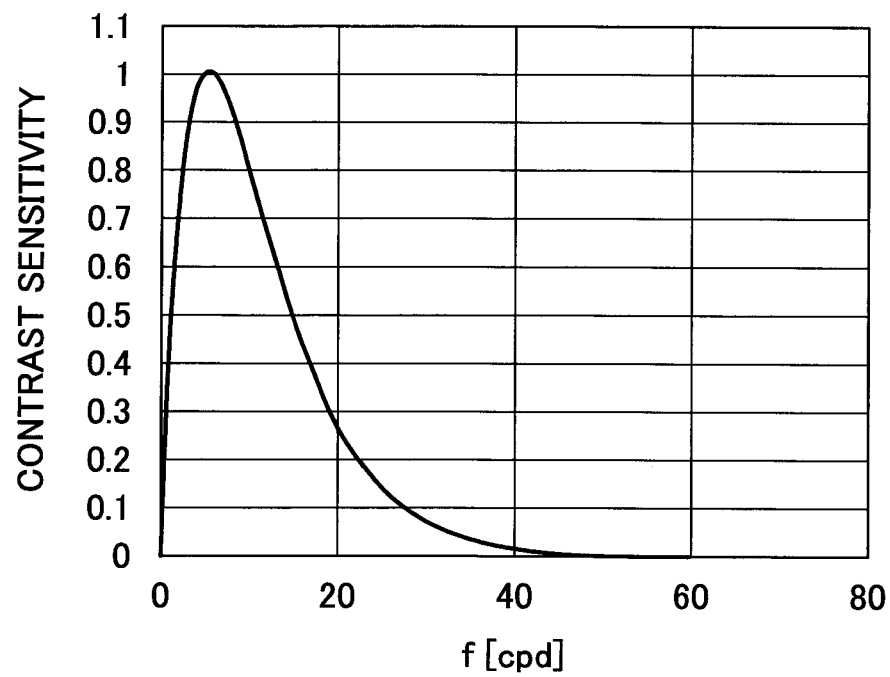
[Fig. 16B]
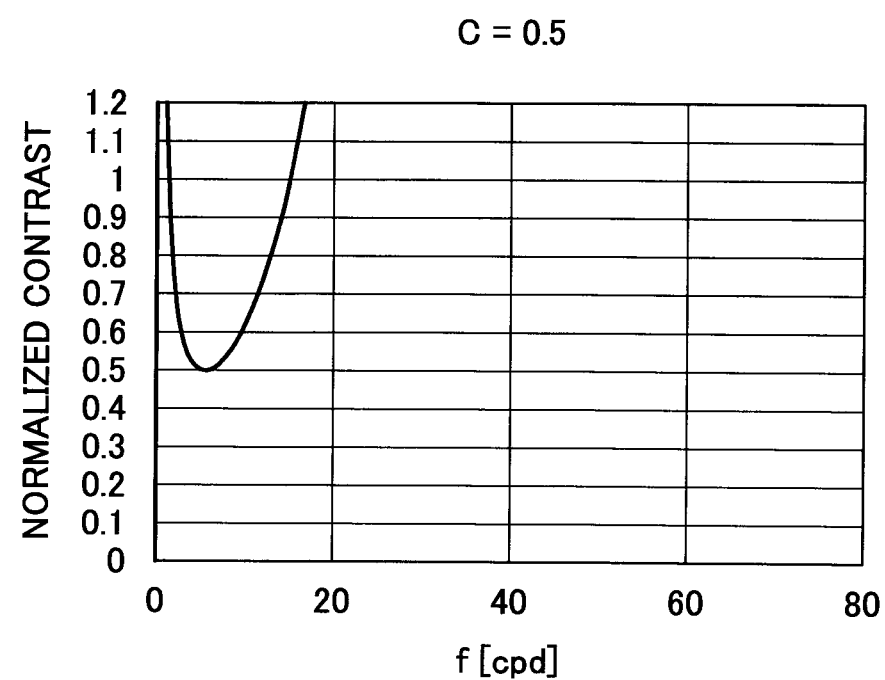

[Fig. 17A]
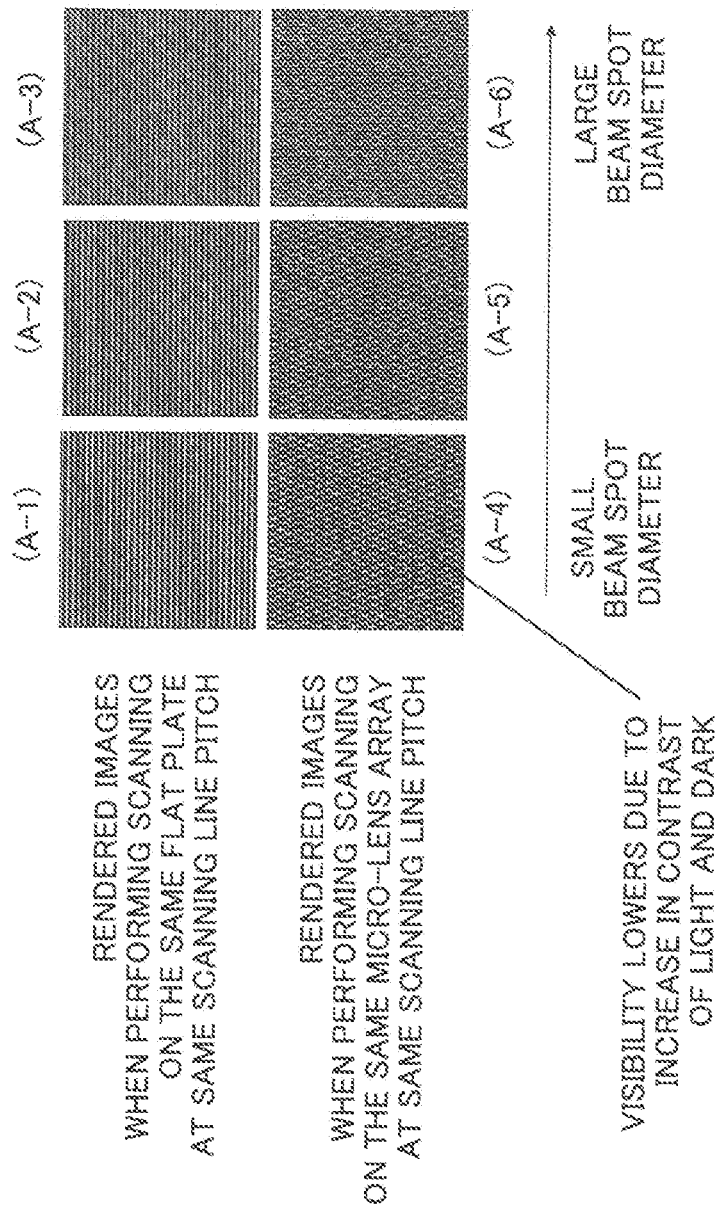

[Fig. 17B]
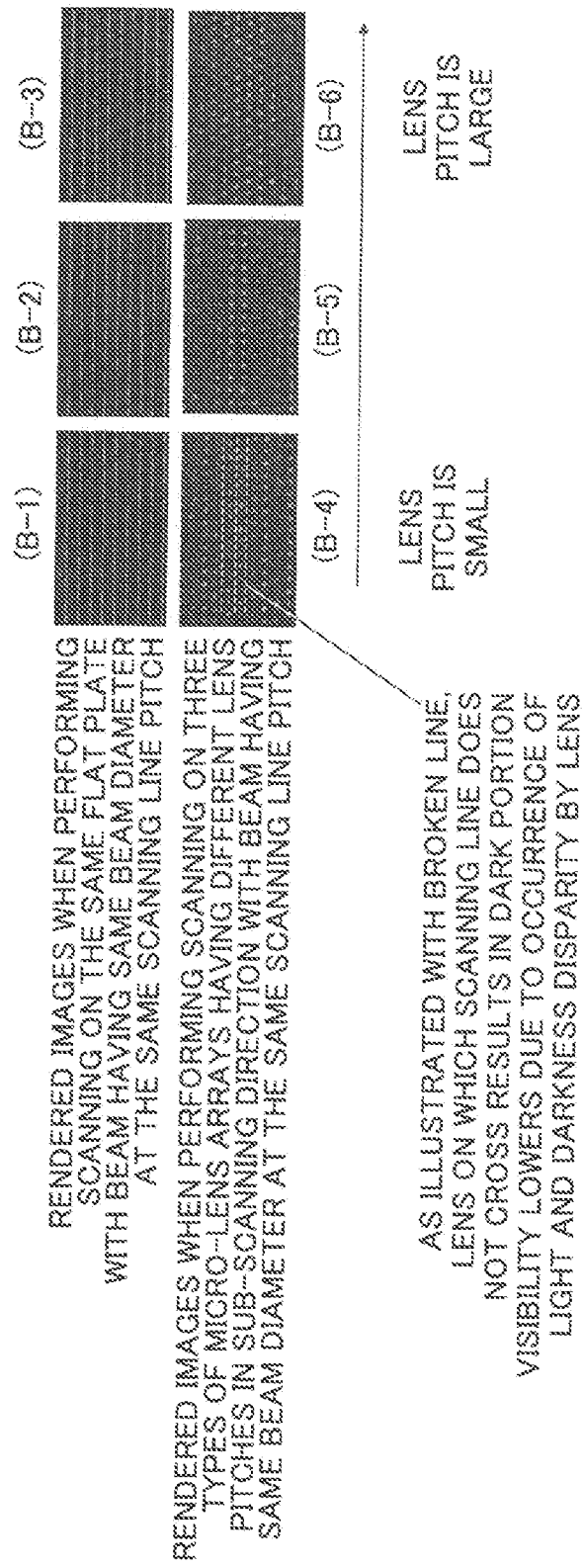

[Fig. 18A]
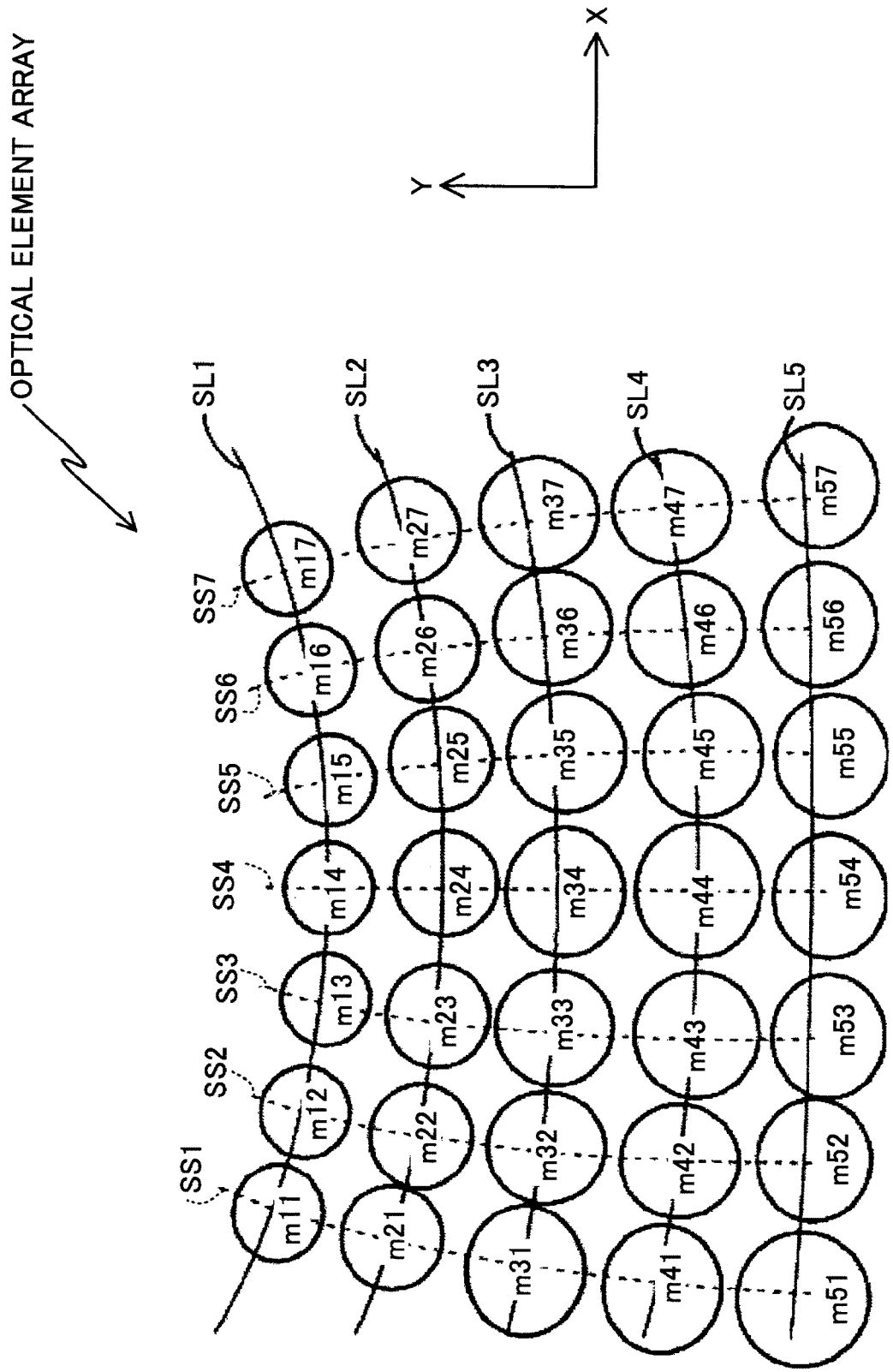

[Fig. 18B]
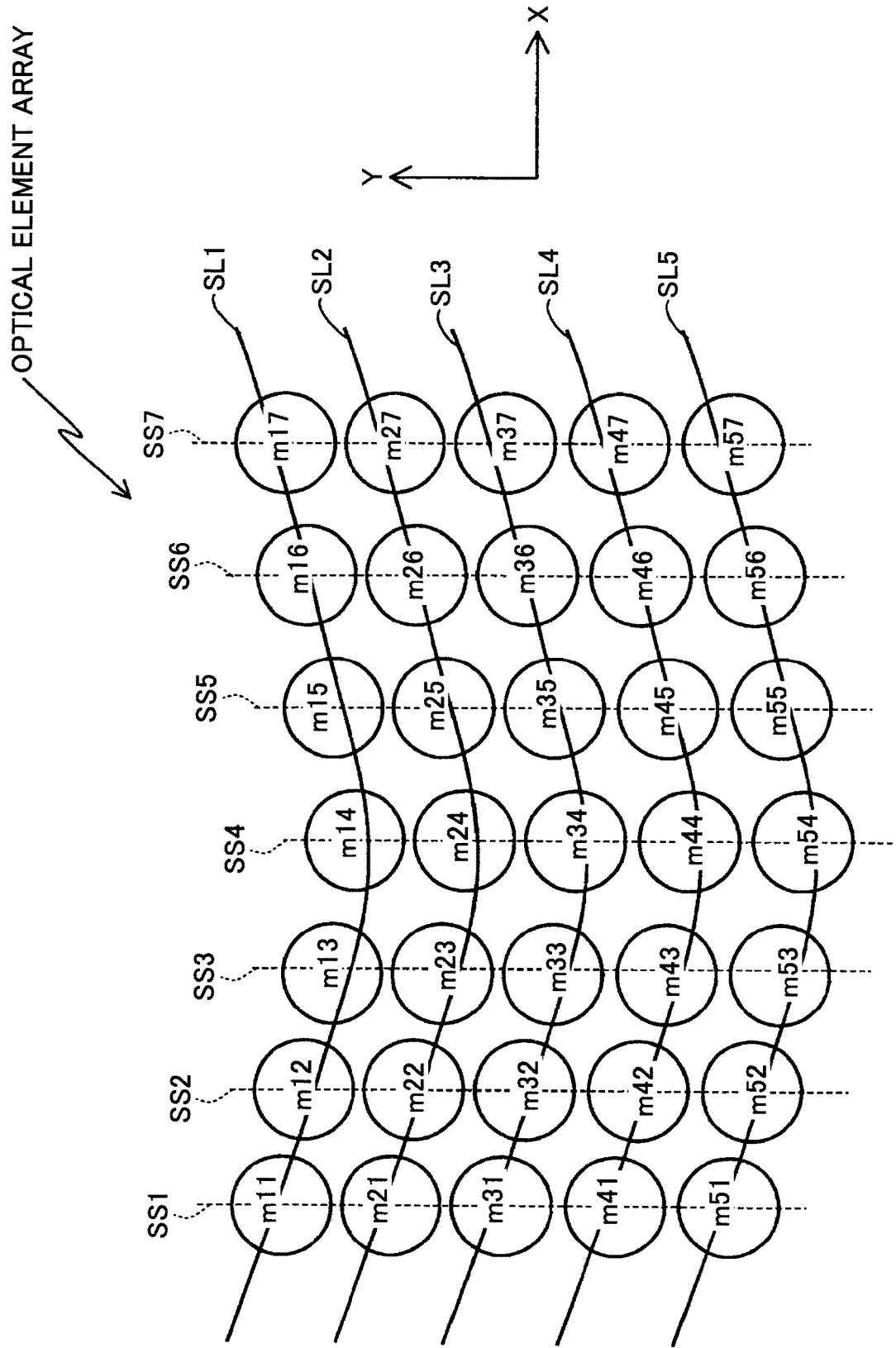

[Fig. 19A]
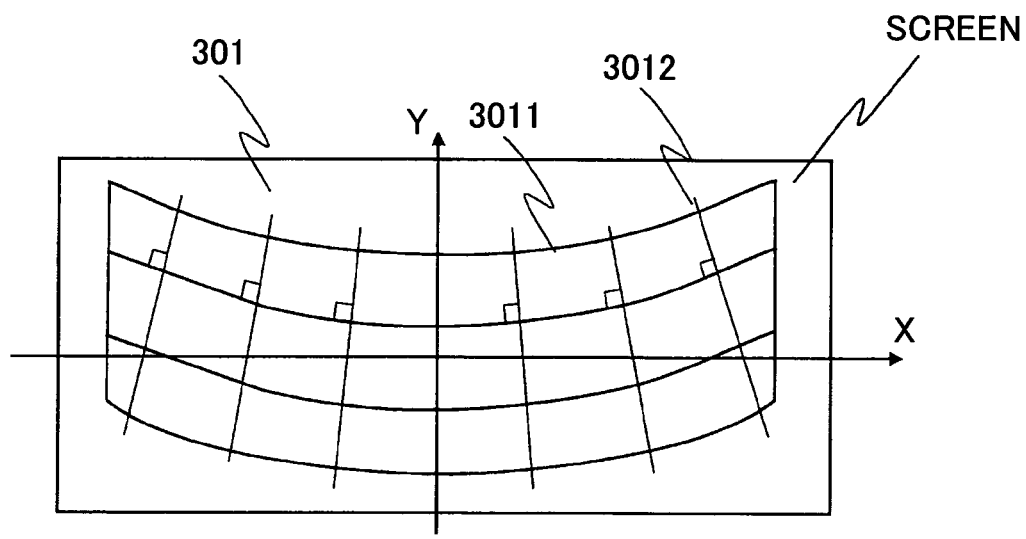
[Fig. 19B]
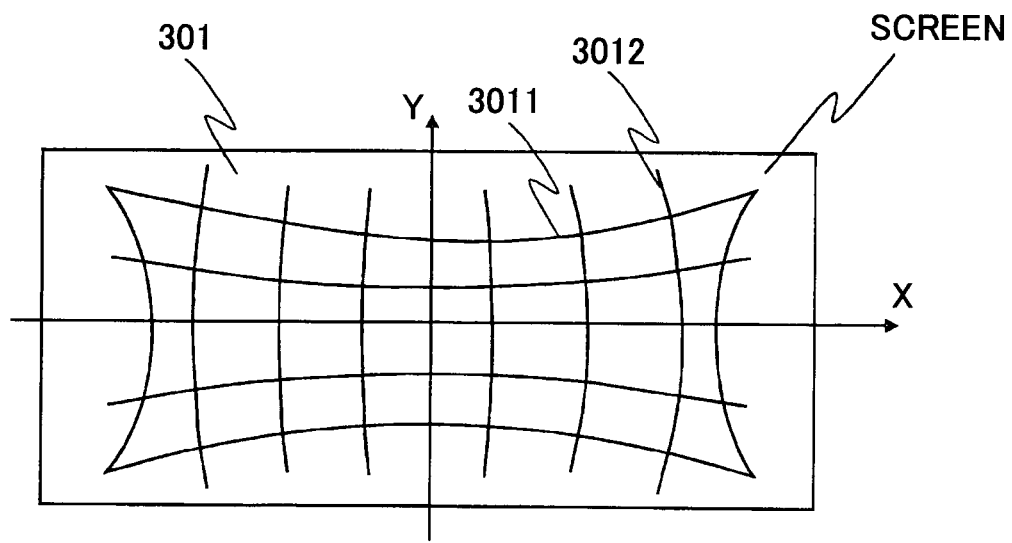

[Fig. 19C]
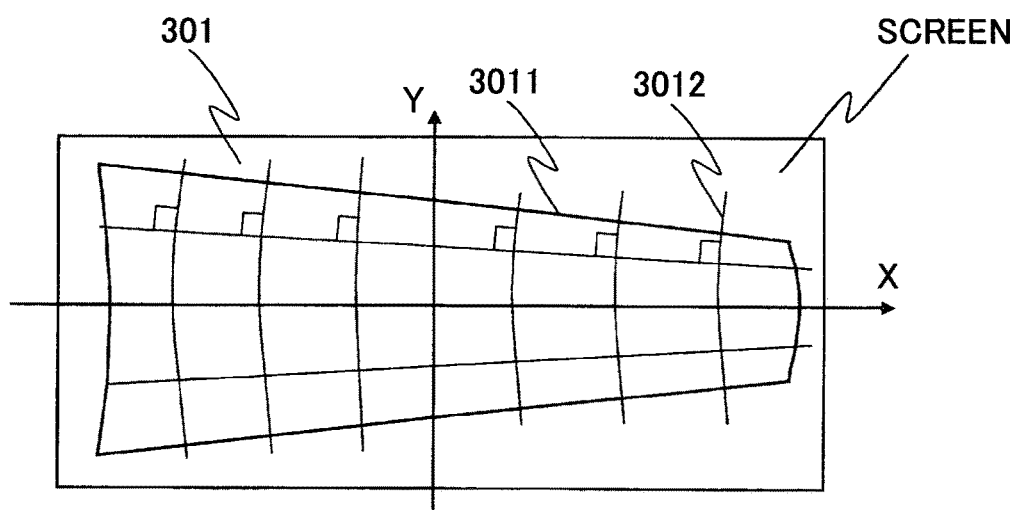
[Fig. 20A]
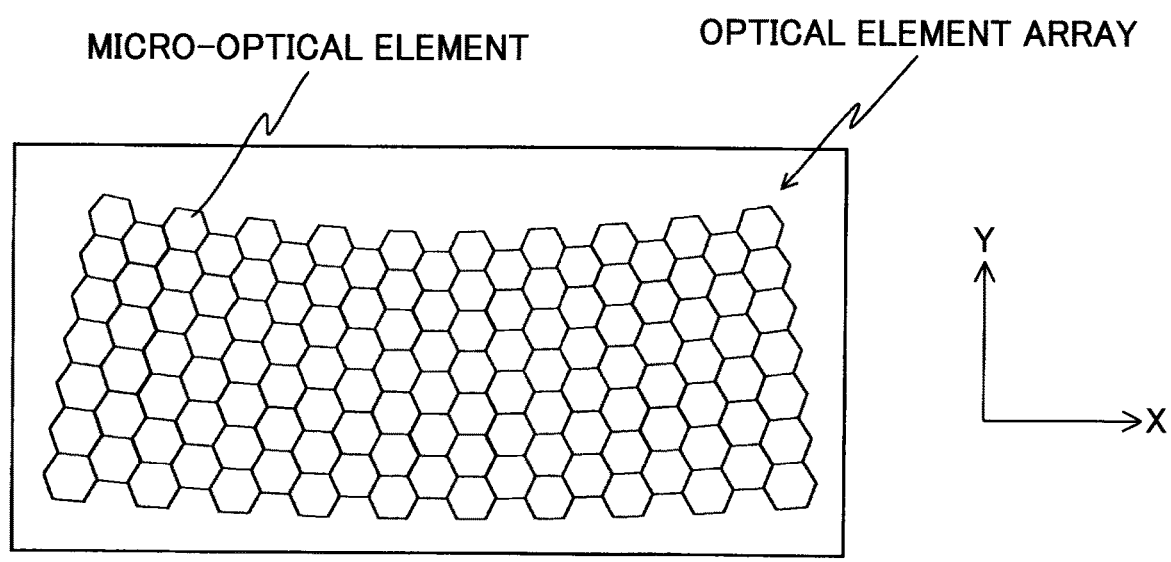

[Fig. 20B]
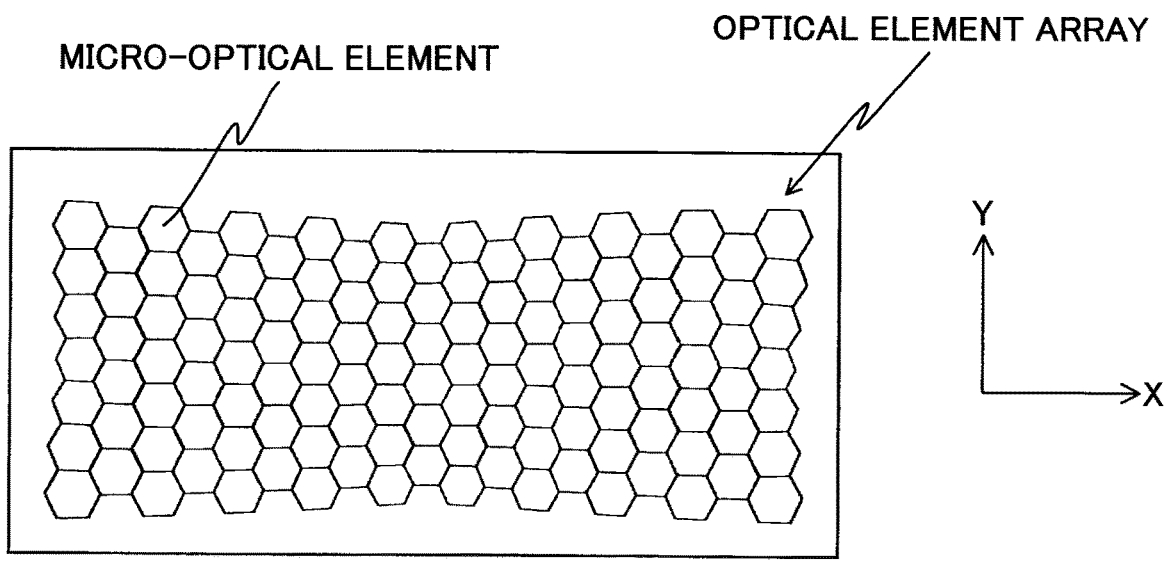
[Fig. 20C]
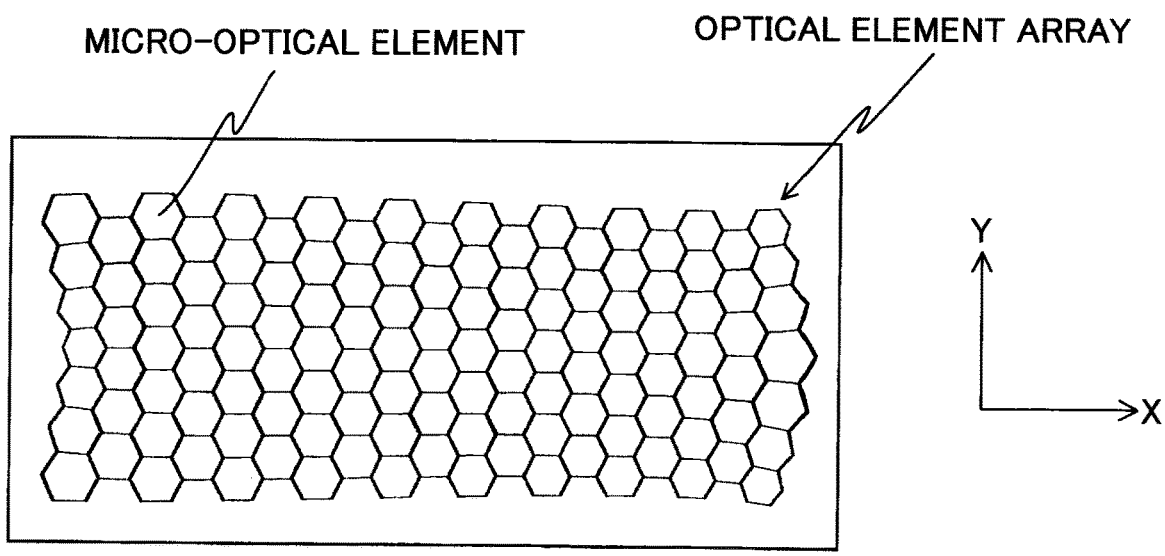

[Fig. 21]
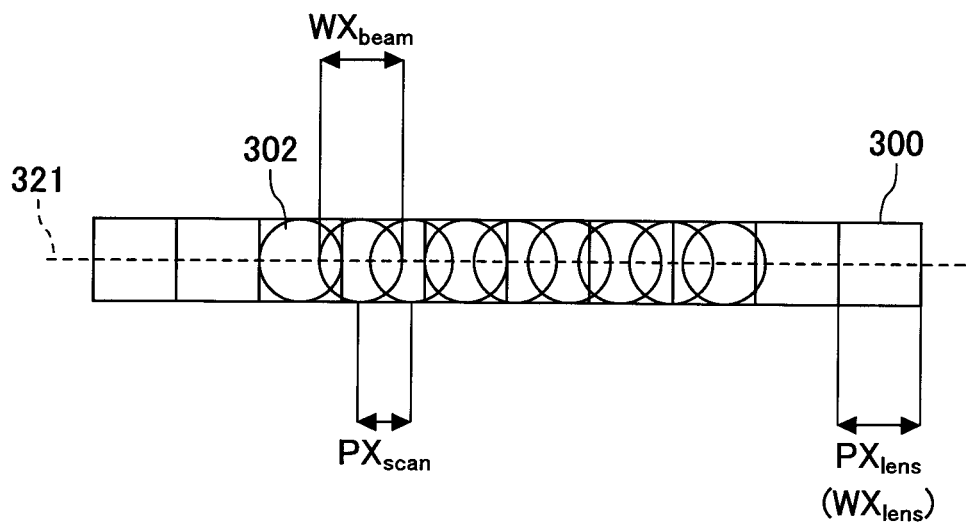
[Fig. 22]
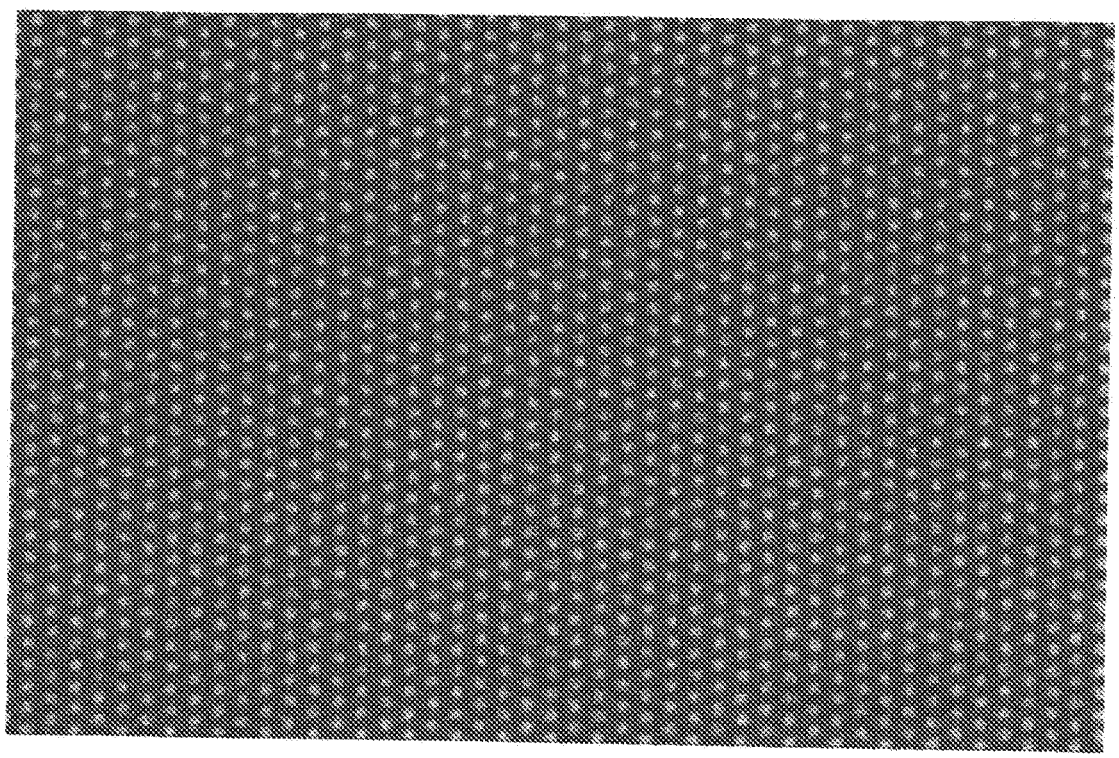

DISPLAY DEVICE, OBJECT APPARATUS, IMAGE FORMING UNIT AND DISPLAY METHOD

TECHNICAL FIELD

The present invention relates to a display device, an object apparatus, an image forming unit and a display method.

BACKGROUND ART

The related art discloses a device for forming an image by scanning an optical element array having multiple optical elements with light two-dimensionally in a main scanning direction and in a sub-scanning direction, and projecting the light forming the image (see, e.g., PLT 1).

CITATION LIST

Patent Literature

PTL 1: Patent Document 1: Japanese Unexamined Patent Application Publication No. 2014-170213

SUMMARY OF INVENTION

Technical Problem

With respect to the device disclosed in PLT 1, the scope for corrective action is associated with controlling against occurrence of a moire phenomenon caused by the optical element array and the scanning line pitch.

Solution to Problem

Accordingly, one aspect of the present invention provides a display device that includes
a light source unit;
a light deflector configured to deflect light from the light source unit;
an optical element array having a plurality of optical elements, the optical element array being two-dimensionally scanned in a main-scanning direction and a sub-scanning direction with light via the light deflector; and
a light projecting unit configured to project light received via the optical element array, wherein
each of a beam spot diameter in the sub-scanning direction on the optical element array and an arrangement pitch of the optical elements in the sub-scanning direction on the optical element array is equal to or greater than a scanning line pitch on the optical element array.

Advantageous Effects of Invention

According to the embodiment of the present invention, it is possible to control against occurrence of a moire phenomenon due to the arrangement of the optical elements and the scanning line pitch.

BRIEF DESCRIPTION OF DRAWINGS

FIG. 1 is a drawing illustrating a schematic configuration of a head-up display (HUD) device, according to the embodiment of the present invention;

FIG. 2 is a block diagram illustrating a hardware configuration of a control system of the HUD device, according to the embodiment of the present invention;

FIG. 3 is a functional block diagram of the HUD device, according to the embodiment of the present invention;

FIG. 4 is a drawing illustrating a light source device of the HUD device, according to the embodiment of the present invention;

FIG. 5 is a drawing illustrating a light deflector of the HUD device, according to the embodiment of the present invention;

FIG. 6 is a drawing illustrating a correspondence relation between a mirror of the light deflector and a scanning range, according to the embodiment of the present invention;

FIG. 7 is a drawing illustrating an example of a trajectory of a scanning line at a time of two-dimensional scanning, according to the embodiment of the present invention;

FIG. 8A is a drawing illustrating a difference in effects due to a difference in size between an incident luminous flux diameter and a lens diameter in a micro-lens array, according to the embodiment of the present invention;

FIG. 8B is a drawing illustrating a difference in effects due to a difference in size between an incident luminous flux diameter and a lens diameter in a micro-lens array, according to the embodiment of the present invention;

FIG. 9 is a drawing (part 1) depicting a configuration example of a screen, according to the embodiment of the present invention;

FIG. 10 is a drawing (part 2) depicting a configuration example of a screen, according to the embodiment of the present invention;

FIG. 11A is a drawing depicting a screen having a micro-lens array in one of differing lens arrangements, according to the embodiment of the present invention;

FIG. 11B is a drawing depicting a screen having a micro-lens array in one of differing lens arrangements, according to the embodiment of the present invention;

FIG. 11C is a drawing depicting a screen having a micro-lens array in one of differing lens arrangements, according to the embodiment of the present invention;

FIG. 11D is a drawing depicting a screen having a micro-lens array in one of differing lens arrangements, according to the embodiment of the present invention;

FIG. 12 is a drawing illustrating the prevention of a moire phenomenon composed of a striped pattern extending in a main scanning direction, according to the embodiment of the present invention;

FIG. 13 is a drawing illustrating a relation between a position of a micro-lens at which a laser beam is incident and intensity of a point on the micro-lens, according to the embodiment of the present invention;

FIG. 14A is a graph depicting a distribution of beam intensity in a case where two beam spots adjacent in a sub-scanning direction partially overlap in one of three patterns with different beam spot diameter/scanning line pitch, according to the embodiment of the present invention;

FIG. 14B is a graph depicting a distribution of beam intensity in a case where two beam spots adjacent in a sub-scanning direction partially overlap in another one of the three patterns with different beam spot diameter/scanning line pitch, according to the embodiment of the present invention;

FIG. 14C is a graph depicting a distribution of beam intensity in a case where two beam spots adjacent in a sub-scanning direction partially overlap in still another one of the three patterns with different beam spot diameter/scanning line pitch, according to the embodiment of the present invention;

FIG. 15 is a graph depicting a relationship between beam spot diameter/scanning line pitch and moire contrast, according to the embodiment of the present invention;

FIG. 16A is a graph depicting a VTF curve, according to the embodiment of the present invention;

FIG. 16B is a graph depicting the limit values of moire frequency and moire contrast which do not give discomfort to a driver, according to the embodiment of the present invention;

FIG. 17A is a drawing illustrating an example of control of moire contrast, according to the embodiment of the present invention;

FIG. 17B is a drawing illustrating an example of control of moire contrast, according to the embodiment of the present invention;

FIG. 18A is a drawing illustrating an embodiment of an optical element array with lens arrangement being a non-parallel arrangement, according to the embodiment of the present invention;

FIG. 18B is a drawing illustrating an embodiment of an optical element array with lens arrangement being nonparallel arrangement, according to the embodiment of the present invention;

FIG. 19A is a drawing illustrating scanning of three patterns having different scanning line shapes, according to the embodiment of the present invention;

FIG. 19B is a drawing illustrating scanning of three patterns having different scanning line shapes, according to the embodiment of the present invention;

FIG. 19C is a drawing illustrating scanning of three patterns having different scanning line shapes, according to the embodiment of the present invention;

FIG. 20A is a drawing depicting an example of the arrangement of micro optical elements following the shape of the scanning line in FIG. 19A, according to the embodiment of the present invention;

FIG. 20B is a drawing depicting an example of the arrangement of micro optical elements following the shape of the scanning line in FIG. 19B, according to the embodiment of the present invention;

FIG. 20C is a drawing depicting an example of the arrangement of micro optical elements following the shape of the scanning line in FIG. 19C, according to the embodiment of the present invention;

FIG. 21 is a drawing illustrating the prevention of moire composed of a striped pattern extending in a sub-scanning direction, according to the embodiment of the present invention;

FIG. 22 is a drawing depicting a rendered image obtained by scanning the macro-lens array with the lens arrangement of FIG. 11D, according to the embodiment of the present invention.

DESCRIPTION OF EMBODIMENTS

Overview

The following describes an HUD device 100 according to an embodiment, with reference to drawings. Note that "HUD" is an abbreviation of "head-up display".

In FIG. 1, an overall configuration of an HUD device 100 according to the present embodiment is schematically illustrated.

Overall Configuration of an HUD Device

Note that projection methods for a head-up display include: a "panel method", in which an intermediate image is formed by means of an imaging device such as a liquid crystal panel, a digital mirror device (DMD) panel or a vacuum fluorescent display (VFD); and a "laser scanning method", in which an intermediate image is formed by means of a two-dimensional scanning device that performs scanning with a laser beam emitted by a laser light source. Particularly, in the latter method, i.e., the laser scanning method, emission or non-emission of light can be assigned for each pixel. Hence, generally, it is possible to form high-contrast images, unlike a panel method, in which images are formed by partially shielding light emission of an entire screen.

Therefore, the "laser scanning method" is employed for the HUD device 100. Needless to say, the "panel method" as described above may be employed as a projection method as well.

For example, the HUD device 100 may be mounted on a vehicle, etc., such that navigation information (e.g., a speed of the vehicle, a traveling direction, a distance to a destination, a name of a current place, the presence or the absence of or a position of an object (i.e. a target object) in front of the vehicle, a sign such as a speed limit sign, information such as traffic congestion information, etc.), which is needed for controlling the vehicle, becomes visible via a front windshield 50 (cf. FIG. 1) of the vehicle. Here, the front windshield 50 functions as a transparent/reflective member, which passes a part of incident light through and reflects at least a part of the remainder. The following mainly describes examples of an HUD device 100 mounted on a vehicle or a car, which is provided with a front windshield 50.

As illustrated in FIG. 1, the HUD device 100 is provided with: a light-scanning device 10 having a light source device 11, a light deflector 15 and a scanning mirror 20; a screen 30; and a concave mirror 40. The HUD device 100 irradiates the front windshield 50 with light (i.e. imaging light) to form an image, such that a virtual image I becomes visible from a viewing point of a viewer A (i.e., in this example, a driver, who is an occupant of the car). That is to say, the viewer A can see an image (i.e., an intermediate image), which is formed (i.e., rendered) by the light-scanning device 10 on a screen, as a virtual image I via the front windshield 50.

For example, the HUD device 100 may be arranged beneath a dashboard of the car. Further, a distance from the viewing point of the viewer A and the front windshield 50 is from about several tens of centimeters to about a meter at most.

In this example, the concave mirror 40 is designed by means of existing optical-design simulation software, such that the concave mirror 40 has a predetermined amount of light condensing power, so as to form the virtual image I at a desired imaging position.

For the HUD device 100, a setting is provided with respect to light condensing power of the concave mirror 40, such that the virtual image I is displayed at a position (i.e., a perspective position) of, for example, a meter or more to 30 meters or less (preferably 10 meters or less) away from the viewing point of the viewer A.

Note that a front windshield is usually not flat but slightly curved. Therefore, the imaging position of the virtual image I is determined based on the curved surfaces of the concave mirror 40 and the front windshield 50.

The light source device 11 synthesizes laser light in three colors, i.e., red (R), green (G) and blue (B), which are modulated in accordance with image data. The synthesized light of the laser light in three colors is guided to the reflection surface of the light deflector 15. The light deflector 15, which is provided as a deflection unit, is a two-axis microelectromechanical system (MEMS) scanner, which is manufactured in a semiconductor process, etc., and includes individual micro mirrors that is capable of oscillating with respect to orthogonal two axes. The light source device 11 and the light deflector 15 will be later described in detail.

Light (i.e., synthesized light) in accordance with image data, which is output from the light source device 11, is via the light deflector 15 and reflected by the scanning mirror 20, such that the screen 30 is irradiated. Here, the screen 30 is light-scanned, such that an intermediate image is formed on the screen 30. That is to say, an optical scanning system is configured with the light deflector 15 and the scanning mirror 20. Note that it is preferred that the concave mirror 40 is designed/arranged so as to correct elements of optical distortion caused by the front windshield 50, due to which a horizontal line of an intermediate image would become convex or concave.

Light that has passed through the screen 30 is reflected by the concave mirror 40 towards the front windshield 50. A part of luminous flux incident to the front windshield 50 passes through the front windshield 50 and at least a part of the remainder is reflected towards the viewing point of the viewer A. Consequently, a virtual image I, which is an intermediate image that is magnified, is visible to the viewer A via the front windshield 50. In other words, a magnified virtual image I is displayed on the front windshield 50 from the perspective of a viewer.

Note that, as a transparent/reflective member, there may be a combiner between the front windshield 50 and the viewing point of the viewer A, such that the combiner is irradiated with light from the concave mirror 40. In this case, a virtual image can be displayed as well, similarly to the case with only the front windshield 50.

Hardware Configuration of a Control System of the HUD Device

FIG. 2 is a block diagram illustrating a hardware configuration of a control system of the HUD device 100. As illustrated in FIG. 2, the control system of the HUD device 100 includes an FPGA 600, a central processing unit (CPU) 602, a read-only memory (ROM) 604, a random access memory (RAM) 606, an interface (I/F) 608, a bus line 610, a laser diode (LD) driver 6111 and a MEMS controller 615.

The FPGA 600 operates an LD, which is explained in the following description, by means of the LD driver 6111 in accordance with image data. Further, the FPGA 600 operates the light deflector 15 by means of the MEMS controller 615. The CPU 602 controls each function of the HUD device 100. The ROM 604 stores a program for image processing, which is executed by the CPU 602 for controlling each function of the HUD device 100. The RAM 606 is utilized as a work area of the CPU 602. The I/F 608 is an interface for communication with an external controller, etc. For example, the I/F 608 may be connected to a controller area network (CAN) of a car, etc.

Functional Block Diagram of the HUD Device

FIG. 3 is a block diagram illustrating functions of the HUD device 100. As illustrated in FIG. 3, the HUD device 100 is provided with a vehicle information input unit 800, an external information input unit 802, an image data generating unit 804 and an image rendering unit 806. To the vehicle information input unit 800, information regarding a vehicle such as speed, traveling distance, a position of a target object or brightness of the surrounding environment is input via a CAN, etc. To the external information input unit 802, information regarding outside of a vehicle such as navigation information from a car navigation system that is mounted on a car is input via an external network. The image data generating unit 804 generates image data representing an image to be rendered, based on information that is input from the vehicle information input unit 800, the external information input unit 802, etc., and transmits the image data to the image rendering unit 806. The image rendering unit 806, which is provided with a control unit 8060, depicts an image in accordance with received image data. The image data generating unit 804 and the control unit 8060 are actualized by the FPGA 600. The image rendering unit 806 is actualized by the LD driver 6111, the MEMS controller 615, the light-scanning device 10, the screen 30, the concave mirror 40, etc., in addition to the FPGA 600.

Configuration of the Light Source Device

FIG. 4 is a drawing illustrating a configuration of the light source device 11. As illustrated in FIG. 4, the light source device 11 includes multiple (e.g., three) light emitting elements 111R, 111B and 111G, each of which is provided with a single or multiple luminous points. Each of the light emitting elements is an LD, which emits luminous flux with mutually different wavelengths $\lambda R$, $\lambda G$, or $\lambda B$. For example, $\lambda R$ equals to 640 nm, $\lambda G$ equals to 530 nm, and $\lambda B$ equals to 445 nm. In the following description, the light emitting element 111R may be also represented as an LD 111R, the light emitting element 111G may be also represented as an LD 111G, and the light emitting element 111B may be also represented as an LD 111B. Each of the luminous flux with wavelength $\lambda R$, $\lambda G$ or $\lambda B$, which is emitted by the LD 111R, the LD 111G or the LD 111B, is coupled by a corresponding coupling lens 112R, 112G or 112B before entering into subsequent parts of the optical system. The coupled luminous flux is reshaped by a corresponding aperture member 113R, 113G or 113B. The opening of each aperture member may be in various shapes such as a round shape, an oval shape, a rectangular shape and a square shape, depending on divergence angle of luminous flux, etc. Then, light that is reshaped by a corresponding aperture is synthesized into a light path by a synthesizing element 115. The synthesizing element 115 is a dichroic mirror in a shape of a plate or a prism, which reflects or transmits luminous flux, depending on wavelengths, and synthesizes the luminous flux into a light path. The synthesized luminous flux is guided by a lens 119 towards the reflection surface of the light deflector 15. The lens 119 is a meniscus lens with a concave surface facing the light deflector 15.

Configuration of the Light Deflector

FIG. 5 is a drawing illustrating a configuration of the light deflector 15. The light deflector 15 is a two-axis MEMS scanner, which is manufactured in a semiconductor process. As illustrated in FIG. 5, the light deflector 15 includes: a mirror 150, which has a reflection surface; multiple beams, which are arranged in a direction of the α-axis; and a pair of serpentine parts 152, in which each pair of adjacent beams is connected via a turn-around part so as to be serpentine. Each pair of adjacent beams in each serpentine part 152 is either beam A (152a) or beam B (152b), and is supported by a frame member 154. Each of the multiple beams is individually provided with a piezoelectric member 156 (e.g., a piezoelectric transducer (PZT)). When different voltages are applied to a pair of adjacent beams in each serpentine part, the pair of adjacent beams in each serpentine part are deflected in different directions. Then, due to accumulation of the deflection, the mirror 150 rotates at a large angle around the α-axis (i.e., in the vertical direction). With the above-described configuration, it is possible to perform light-scanning in a vertical direction with the α-axis as the central axis by use of low voltage. Contrarily, in a horizontal direction with the β-axis as the central axis, light-scanning is performed by use of resonance with a torsion bar, etc., that is connected to the mirror 150.

Although the HUD device 100 momentarily projects only a point image that corresponds to a diameter of a laser beam, an afterimage sufficiently remains to human eyes within a frame of an image because scanning is performed extremely quickly. Taking advantage of such an afterimage phenomenon, a viewer perceives as if an image were projected on a "display area". In reality, an image appearing on a screen is reflected by the concave mirror 40 and the front windshield 50, such that a viewer perceives a virtual image of the image on the "display area". Having the above-described mechanism, it is possible to stop emission of an LD, in a case of not displaying an image. In other words, in the "display area", luminance of a non-displaying area of a virtual image can be substantially 0.

As described, imaging of a virtual image is performed by the HUD device 100 at an imaging position in a predetermined "display area", where imaging of the virtual image is possible. The "display area" is determined as specified when designing the HUD device.

Therefore, as a "laser-scanning method" is employed, it is possible to turn off a light of an LD or to decrease an amount of light at a non-displaying area, where displaying is not needed.

By contrast, in a "panel method", which expresses an intermediate image with an imaging device such as a liquid crystal panel or a DMD panel, it is necessary to illuminate the entire panel. Hence, even with an image signal indicating a black-display for non-display, it is difficult to completely set it to 0, due to characteristics of a liquid crystal panel or a DMD panel. herefore, there have been cases where a black part appears to be glowing (or floating). However, in a laser-scanning method, it is possible to eliminate glowing of black (or black floating).

Note that each emitting element of the light source device 11 is controlled by the FPGA 600 with respect to luminescence intensity, lighting timing and optical waveforms and is driven by the LD driver 6111 to emit light. As illustrated in FIG. 6, light that is emitted by each of the emitting elements and synthesized into a light path is two-dimensionally deflected around an α-axis and a β-axis by the light deflector 15, and is emitted onto the screen 30 as scanning light via the scanning mirror 20 (see FIG. 1). That is, the screen 30 is two-dimensionally scanned by the scanning light. Note that, illustration of the scanning mirror 20 is omitted from FIG. 6.

The scanning light performs oscillatory scanning (i.e., two-way back-and-forth scanning) in the main-scanning direction at a high-order frequency of approximately 20000 to 40000 Hz while simultaneously performing one-way scanning in the sub-scanning direction at a low-order frequency of approximately several tens of Hz. That is, raster scanning is performed in the main-scanning direction at a first frequency and in the sub-scanning direction at the second frequency that is lower than the first frequency. In this case, rendering per a pixel and displaying of a virtual image may be achieved by controlling emission of each emitting element in accordance with scanning position (i.e., position of the scanning light).

Time for rendering a screen, i.e., scanning time (i.e., a cycle of two dimensional scanning) per a frame, is several tens of milliseconds because a sub-scanning cycle is, as described above, several tens of Hz. For example, in a case where a main-scanning cycle is 20000 Hz and a sub-scanning cycle is 50 Hz, scanning time per a frame is 20 milliseconds.

The screen 30 includes, as described in FIG. 7, an image region 30a (i.e., a valid scanning region) in which an image is rendered (i.e., irradiated with light modulated in accordance with image data); and a frame region 30b surrounding the image region.

In the following description, the entire range that may be scanned by the light deflector 15 is referred to as a "scanning range". Note that, in this embodiment, the scanning range indicates a range combining the image region 30a and a part (i.e., a part near the outer edge of the image region 30a) of the frame region 30b of the screen 30. In FIG. 7, a trajectory of a scanning line in a scanning range is illustrated with a zigzag line. In FIG. 7, for convenience, the number of scanning lines is fewer than in reality.

A synchronization detecting system 60 including a light receiving element is installed in the peripheral region (a part of the frame region 30b) near the image region 30a within the scanning range. In the following description, an X direction represents the main-scanning direction a Y direction represents the sub-scanning direction of the screen 30. In this example, the synchronization detecting system 60 is placed in the positive Y side of the corner, that is, the corner formed by the negative X-direction and positive Y-direction of the image region.

The synchronization detecting system 60 detects operation of the light deflector 15 to output, to the FPGA 600, a synchronization signal for determining timing to start scanning and timing to finish scanning.

The image region 30a of the screen 30 is configured with a transparent element exhibiting a light diffusion effect such as a micro-lens array. The image region is not necessarily a rectangular shape or a flat shape; the image region may be a polygonal shape or a curved surface. Further, the screen 30 may be a flat plate or a curved plate without exhibiting a light diffusion effect. Further, the image region may be a reflective element exhibiting a light diffusion effect such as a micro-mirror array, depending on device layouts.

The following describes diffusion and occurrence of coherence noise with respect to a micro-lens array employed for an image region of the screen 30, with reference to FIGS. 8A and 8B. In FIG. 8A, the reference numeral 852 indicates a micro-lens array. The micro-lens array 852 has a micro convex lens configuration, which includes aligning micro convex lenses 851. A luminous flux diameter 857 of a "pixel displaying beam", which is indicated by the reference numeral 853, is smaller than the size of a micro convex lens 851. In other words, the size 856 of the micro convex lens 851 is larger than the luminous flux diameter 857. Note that, in the practical examples of this description, the pixel displaying beam 853 is a laser luminous flux with light intensity distribution in the form of Gaussian distribution around the center of the luminous flux. Accordingly, the luminous flux diameter 857 is a radial directional distance of luminous flux with light intensity in the light intensity distribution decreasing to "$1/e^2$".

Although, in FIG. 8A, the luminous flux diameter 857 is illustrated with the same size as the size 856 of the micro convex lens 851, the luminous flux diameter 857 is not necessarily the same size as "the size 856 of the micro convex lens 851"; the luminous flux diameter 857 is merely required not to exceed the size 856 of the micro convex lens 851.

In FIG. 8A, the entirety of the pixel displaying beam 853 is incident to a micro convex lens 851 and is converted into diffused luminous flux 854 with a divergence angle 855. Note that in the following description, the "divergence angle" may also be referred to as a "diffusion angle".

In the example illustrated in FIG. 8A, coherence noise does not occur because there is a diffused luminous flux 854 alone and there is no other luminous flux to interfere with. Note that the size of the divergence angle 855 may be appropriately adjusted with the shape of the micro convex lens 851. In the example illustrated in FIG. 8B, a pixel displaying beam 811 has a luminous flux diameter twice the alignment pitch 812 of the micro convex lenses, and is incident across the two micro convex lenses 813 and 814. In this case, the pixel displaying beam 811 is diffused by the two incident micro convex lenses 813 and 814 as two diffused luminous fluxes 815 and 816. The two diffused luminous fluxes 815 and 816 overlap in a region 817 to mutually interfere with, thereby generating coherence noise in this region.

The following describes a configuration of the screen 30 in detail. FIG. 9 and FIG. 10 are drawings illustrating configuration examples of the screen 30.

The screen 30 is composed of an optical plate 301 in which micro optical elements 300 are aligned. When the incident luminous flux 302 scans the optical plate 301, the luminous flux is diverged by the micro optical elements 300 to become a diffused luminous flux 303. According to the structure of the micro optical elements 300, the incident luminous flux 302 may be diverged at a desired divergence angle 304.

Note that in FIG. 9, the screen 30 is described in the form of a convex lens array; however, the screen 30 that is in the form of a concave lens array or in the form of other reflective micro-mirror arrays (including a convex surface and a concave surface) will provide the same effect.

The screen 30 has an array structure having the micro optical elements 300 arranged without gaps, and diverges laser light (scanning light) from the light-scanning device 10 at a desired divergence angle. The micro optical elements 300 are each a micro-lens or micro-mirror having a width of approximately 200 μm and have a planar shape that is a hexagonal shape (a shape viewed from a Z axis direction). The hexagonal shape of the micro optical elements 300 allows the micro optical elements 300 to be aligned closest to each other (see FIGS. 11C and 11D). In the following description, a "micro-lens" will also be referred to as a "lens" wherever appropriate, and a "micro-mirror" will also be referred to as a "mirror" wherever appropriate.

The planar shape of the micro optical element 300 is not limited to a hexagonal shape and may be a quadrangle (see FIGS. 11A and 11B) or a triangle. In FIGS. 11A to 11C, $P_{lens}$ represents a lens pitch in the sub-scanning direction (a lens arrangement pitch), $W_X$ represents a width of the lens in the main-scanning direction, and $W_Y$ represents a width of the lens in the sub-scanning direction.

In the present embodiment, illustration is given with an example of the structure in which the micro optical elements 300 are regularly arranged; however, the present invention is not limited to this example. The structure may have an eccentric arrangement in which the micro optical elements 300 are arranged irregularly by allowing the optical center of the micro optical elements 300 to deviate (be eccentric) from the geometric center. In a case of adopting the eccentric arrangement, the micro optical elements 300 have mutually different shapes.

FIG. 12 is a drawing illustrating a relationship between a scanning route and the beam spots on the screen 30. The following describes a case where the micro optical elements 300 are each a micro-lens, that is, the screen 30 includes a micro-lens array as an optical element array. In FIG. 12, the lens arrangement (square arrangement) of FIG. 11A is adopted. In FIG. 12, reference numerals 321 and 302 denote a scanning line and beam spots, respectively. In this example, the scanning line 321 is a zigzag line; however, the scanning line 321 may have a shape other than the zigzag line.

In FIG. 12, a wider (larger) one of intervals of the scanning lines adjacent in the sub-scanning direction (Y direction) at an end of the micro-lens array in the main-scanning direction (X direction) is defined as a "scanning line pitch $P_{scan}$" (see FIG. 12). Note that the end of the micro-lens array in the main-scanning direction described above more specifically indicates an outer end of the lens at the end in the main scanning direction. In FIG. 12, $P_{scan}$ is constant. Note that a "scanning line" is trajectory of a scanning beam (scanning light) on a micro-lens array, and indicates a scanning line extending substantially in the main-scanning direction in this example. The scanning line pitch may also be referred to as a "scanning line interval".

In FIG. 12, the scanning lines are zigzag lines (nonparallel to each other), and the "scanning line pitch" is thus defined as an interval between the adjacent scanning lines at a position with respect to the main-scanning direction where the interval becomes widest (largest) between the adjacent scanning lines on the micro-lens array. However, when scanning the micro-lens array with scanning lines parallel to each other, the interval between adjacent scanning lines is constant. Accordingly, the "scanning line pitch" is uniquely determined as "the interval between adjacent scanning lines".

Further, in FIG. 12, an optical scanning route scanned by sinusoidal oscillation is illustrated as an example for defining the scanning line pitch; however, the scanning line pitch $P_{scan}$ may be similarly defined in performing Lissajous scanning, which may also be included within the scope of the present invention.

Further, $W_{beam}$ may be defined as a beam spot diameter in the sub-scanning direction on the micro-lens array and $P_{lens}$ may be defined as a lens pitch in the sub scanning direction (array pitch of micro-lenses).

When scanning a micro-lens array, which is composed of regularly arranged multiple micro optical elements at a constant scanning line pitch, a moire phenomenon (striped pattern extending in the main-scanning direction) caused by the arrangement of the micro optical elements, and the scanning line pitch may be generated. This moire phenomenon lowers the quality of the image (intermediate image) rendered on the screen, which further lowers the quality of the virtual image that is a display image displayed by the HUD device. Hereinafter, a "moire" phenomenon indicates a striped pattern extending in the main-scanning direction unless otherwise specified.

Accordingly, the inventors developed a technique for controlling against the occurrence of a moire phenomenon in order to prevent deterioration of the quality of the virtual image, which is the display image of the HUD device. The following illustrates details of this technique. Note that the beam spots are in practice formed at different times varying from each other; however, such a time difference is extremely small as described above. Hence, it is assumed that there is no time difference in forming the beam spots in the following example.

Note that a moire pitch $P_{moire}$, which is an interval (pitch) of moire stripes, is generally represented by the following formula (1).

Math 1

$$P_{moire} = \frac{2P_{scan}P_{lens}}{(P_{lens} - P_{scan})} \text{ [mm]} \quad (1)$$

When the unit of the above formula (1) is converted into pixel density, the following formula (2) is obtained.

Math 2

$$P_{moire} = \frac{2P_{scan}P_{lens}}{(P_{lens} - P_{scan})} \div P_{lens} = \frac{2P_{scan}}{(P_{lens} - P_{scan})} \text{ [cycle}(pix)] \quad (2)$$

Further, taking account of the pixel density of the HUD device, the moire frequency $f_{moire}$, which is the frequency of the stripes of the moire, is converted into the angle of view and expressed as the following formula (3).

Math 3

$$f_{moire} = Y_{cpd} \div \frac{2P_{scan}}{(P_{lens} - P_{scan})} = \frac{Y_{cpd}(P_{lens} - P_{scan})}{2P_{scan}} \left[\frac{\text{cycle}}{\text{deg}}\right] \quad (3)$$

As a result of experiments, the inventors have found that when $W_{beam} \geq P_{scan}$ and $P_{lens} \geq P_{scan}$ were satisfied; that is, when the scanning beams adjacent in the sub-scanning direction on each micro-lens had an overlapping portion of a certain amount or more, the occurrence of a moire phenomenon may be controlled against. In a case of $P_{lens} \geq P_{scan}$, scanning may be performed such that at least one scanning line crosses (passes through) each micro-lens (see, for example, FIG. 12). Further, in a case of $W_{beam} \geq P_{scan}$, scanning may be performed such that the scanning beams adjacent in the sub-scanning direction partially overlap.

The following illustrates a reason why the occurrence of a moire phenomenon in the sub scanning direction may be controlled against when $W_{beam} \geq P_{scan}$ and $P_{lens} \geq P_{scan}$ are satisfied.

First, a moire phenomenon in a relationship between $P_{lens}$ and $P_{scan}$, that is, a relationship between the lens pitch in the sub-scanning direction and the scanning line pitch will be described.

FIG. 13 is a drawing illustrating a relationship between an incident position of the light flux 803 on the micro-lens 801 and intensity of a point on the micro-lens 801 in the micro-lens array. With respect to the micro-lens 801, it is assumed that the optical center matches the geometric center.

The luminous flux 803 has an intensity profile with Gaussian distribution, which is generally unique to laser light. Therefore, the intensity is high at the center of luminous flux and becomes lower with increasing distance from the center.

Here, the following assumes a case where the luminous flux 803 that has passed through the micro-lens 801 is observed from the front of the micro-lens 801.

As illustrated as A in FIG. 13, in a case where a luminous flux with beam intensity illustrated with a solid line is incident to the micro-lens 801, intensity of a point on the micro-lens 801 is high because the center of the micro-lens 801 approximately matches the center of the incident luminous flux.

By contrast, as illustrated as B in FIG. 13, in a case where a luminous flux with beam intensity illustrated with the broken line is incident to the micro-lens 801, intensity of a point on the micro-lens 801 is low because the center of the micro-lens 801 and the center of the luminous flux are misaligned; this indicates that the luminous flux that passes through the center of the micro-lens 801 has intensity of the edge of Gaussian distribution. In other words, in FIG. 13, intensity of a point on the micro-lens 801 is lower in B than in A.

As is clear from the above description, intensity of a point on the micro-lens 801 becomes lower as the center of luminous flux incident to the micro-lens 801 is further deviated from the center of the micro-lens 801.

Therefore, the micro-lens array is scanned such that an overlapping portion of the adjacent beam spots is positioned at the center of each micro-lens. This will control against the reduction of the intensity of a point on the micro-lens, which will further reduce luminance unevenness of the entire micro-lens array.

Next, moire contrast determined by a relationship between $W_{beam}$ and $P_{scan}$, that is, a relationship between the beam spot diameter in the sub-scanning direction and the scanning line pitch will be described with reference to FIGS. 14A to 14C. Hereinafter, the beam spot diameter in the sub-scanning direction is simply referred to as a "beam spot diameter" unless otherwise specified.

In this example, a case is considered where two beam spots, respective centers of which are separated by a scanning line pitch in the sub-scanning direction, are superimposed. FIGS. 14A, 14B and 14C illustrate examples where the beam spot diameter/scanning line pitch is 1.0, 1.5 and 2.0, respectively. In FIGS. 14A to 14C, respective intensities of the two beam spots are represented by "f1" and "f2", and intensity of the superimposed beam spot is represented by "f1+f2".

As is clear from FIGS. 14A to 14C, as the beam spot diameter increases with respect to the scanning line pitch, the moire contrast (the depth of a valley between the respective intensities of the two beam spots) decreases. In the example of FIG. 14A, the moire contrast is the maximum and in the example of FIG. 14C, the moire contrast is the minimum.

Thus, in order to reduce moire contrast, it is preferable to set the beam spot diameter/scanning line pitch ≥1, that is, $W_{beam} \geq P_{scan}$.

Note that for the intensity profile formed by the two adjacent scanning lines and the beam profile, the moire contrast $C_{moire}$ may be represented by the following formula (4), with $I_{max}$ being intensity on the scanning line and $I_{min}$ being intensity at the intermediate position between the two scanning lines.

Math 4

$$C_{moire} = \frac{I_{max} - I_{min}}{I_{max} + I_{min}} \quad (4)$$

As illustrated in FIG. 15, when the moire contrast $C_{moire}$ is represented by the ratio between the beam spot diameter $W_{beam}$ and the scanning line pitch $P_{scan}$, and a linear approximation is calculated, the following formula (5) is obtained. Note that in FIG. 15, x is a horizontal axis and y is a vertical axis.

Math 5

$$C_{moire} = -0.9 \frac{W_{beam}}{P_{scan}} + 1.5 \qquad (5)$$

According to the above formula (5), $C_{moire} \leq 0.6$ is obtained when $W_{beam} \geq P_{scan}$, which clearly illustrates that the moire contrast becomes sufficiently small.

FIG. 16A and FIG. 16B are drawings illustrating a relationship of the contrast sensitivity (sensitivity to moire contrast) with respect to spatial frequency (moire frequency). According to the literature (Kenji Kagitani, Makoto Hino and Susumu Imakawa Advancement Technology Development Center, Ricoh Co., Ltd. Yokohama, Japan Image Noise Evaluation Method for Color Hardcopy), a formula of the contrast sensitivity with respect to the spatial frequency is expressed as a VTF (Visual Transfer Function) curve and represented by the following formula (6).

Math 6

$$VTF(f) = 5.05 \cdot \exp(-0.138 \cdot f) \cdot (1.0 - \exp(-0.1 \cdot f)) \qquad (6)$$

Note that "f" in the above formula (6) is an abbreviation for $f_{moire}$.

The VTF curve represented by the above formula (6) is normalized by the contrast sensitivity at the frequency peak (the peak of the moire frequency) as illustrated in FIG. 16A. Therefore, an attempt has been made to set a limit value of moire visibility based on moire frequency and moire contrast by setting a limit value of visibility of moire contrast generated at the frequency peak.

As a method for such an attempt, a functional evaluation in the visibility of stripes with different moire contrast was carried out at the frequency peak where the contrast sensitivity reached the maximum. The result indicated that when the moire contrast was 0.5 or less, the stripes were visually recognizable without giving discomfort to a viewer (a driver). Thus, the VTF curve is normalized with the inverse of the VTF curve formula with respect to the allowable moire contrast value of 0.5. That is, when the vertical axis represents normalized contrast as illustrated in FIG. 16B, the limit curve of the moire frequency and moire contrast is represented by the following formula (7).

Math 7

$$C(f_{moire}, W_{beam}, P_{scan}) = \frac{C_{max}}{VTF(f)} = \frac{0.5}{5.05 \cdot \exp(-0.138 \cdot f) \cdot (1.0 - \exp(-0.1 \cdot f))} \qquad (7)$$

Note that "f" in the above formula (7) is an abbreviation for $f_{moire}$.

Accordingly, the moire phenomenon, which is set by the moire frequency and the moire contrast and does not give discomfort to a driver (a viewer), is represented by the following formula (8) and FIG. 16B.

Math 8

$$\frac{0.5}{5.05 \cdot \exp(-0.138 \cdot f_{moire}) \cdot (1.0 - \exp(-0.1 \cdot f_{moire}))} \geq C \qquad (8)$$

In FIG. 16B, the range on the lower side of the curve is a range within which the driver does not feel discomfort.

In the formulas (7) and (8), $C_{max}$ is set to 0.5, but it is known that when $C_{max}$ is 0.6 or less, almost no discomfort is felt by drivers except for sensitive drivers.

Next, an embodiment for controlling the moire contrast will be described with reference to FIGS. 17A and 17B.

As may be clear from the drawings, (A-1) to (A-3) in FIG. 17A indicate three rendered images when the same flat plate is scanned with three types of scanning beams having different beam diameters such that the respective scanning line pitches are constant. There is a relationship between the beam diameters of the respective scanning beams that is represented by (A-1)<(A-2)<(A-3), and there is a relationship in luminance between the respective rendered images that is represented by (A-1)<(A-2)<(A-3).

Further, (A-4) to (A-6) in FIG. 17A indicate three rendered images when the same micro-lens array is scanned with three types of scanning beams having different beam diameters such that the respective scanning line pitches are constant. There is a relationship between the beam diameters of the scanning beams that is represented by (A-4)<(A-5)<(A-6). As may be seen from (A-4) to (A-6) in FIG. 17A, under the condition in which a scanning line pitch is constant, the contrast of the rendered image decreases (luminance uniformity increases) as the beam diameter increases. Accordingly, moire contrast decreases (luminance uniformity increases) as a beam diameter increases.

As a result, levels of visibility are represented by (A-4)<(A-5)<(A-6).

Further, (B-1) to (B-3) in FIG. 17B indicate three rendered images when the same flat plate is scanned with scanning beams having a constant (same) beam diameter such that respective scanning line pitches are constant.

Further, (B-4) to (B-6) in FIG. 17B indicate three rendered images when three types of micro-lens arrays at different lens pitches in the sub-scanning direction are scanned with scanning beams having a constant (same) beam diameter such that respective scanning line pitches are constant.

As may be seen from (B-4) to (B-6) in FIG. 17 (B), the beam diameter and the scanning line pitch are constant; hence, as the lens pitch increases, with respect to scanning lines extending across (passing across) lenses, both the number of lenses and the number of scanning lines increase (the number of lenses to be darkened decreases). Therefore, in principle, in a case of lens pitch scanning line pitch, the scanning line passes through all the lenses, thereby lowering moire contrast (luminance uniformity increases).

As a result, levels of visibility are represented by (B-4)<(B-5)<(B-6).

FIG. 22 is a drawing illustrating a rendered image when the micro-lens array with the lens arrangement (honeycomb arrangement) of FIG. 11D is scanned to satisfy the conditions represented by $W_{beam} \geq P_{scan}$ and $P_{lens} \geq P_{scan}$. As being clear from the rendered image in FIG. 22, occurrence of a moire phenomenon in the rendered image is clearly controlled against.

Next, a micro-lens array with a nonparallel lens arrangement will be described with reference to FIGS. 18A and 18B. Here, the "non-parallel arrangement" means a lens arrangement in which lines passing through the centers of multiple lenses as arranged along the main-scanning direction are not parallel.

In the micro-lens array illustrated in FIG. 18A, the centers of multiple lenses, as arranged along the main-scanning direction, are curved lines symmetrical with respect to the center in the main-scanning direction (on curves convex toward one side in the sub-scanning direction, in other words, on curves convex toward the lower side of the page of FIG. 18A). In addition, curvatures of (five in FIG. 18A) multiple curves SL1 to SL5, as arranged along the sub-scanning direction, monotonically change in the sub-scanning direction. That is, a relationship between the multiple curves SL1 to SL5 is represented by: curvature of SL1>curvature of SL2>curvature of SL3>curvature of SL4>curvature of SL5. The curves SL1 to SL5 may also be regarded as scanning lines. The centers of the multiple lenses, as arranged along the sub-scanning direction, that are at the center in the main-scanning direction, are on the straight line (SS4). The centers of the multiple lenses, as arranged along the sub-scanning direction, that are at positions other than the center in the main-scanning direction are on curves (convex curves on either side of the center in the main-scanning direction).

In FIG. 18A, symbol SS1 indicates a curve passing through the centers of the lenses m11, m21, m31, m41 and m51, and crossing the curves SL1 to SL5. Symbol SS2 indicates a curve passing through the centers of the lenses m12, m22, m32, m42 and m52, and crossing the curves SL1 to SL5. Symbol SS3 indicates a curve passing through the centers of the lenses m13, m23, m33, m43 and m53, and crossing the curves SL1 to SL5. Symbol SS4 indicates a straight line passing through the centers of the lenses m14, m24, m34, m44 and m54, and crossing the curves SL1 to SL5. Symbol SS5 indicates a curve passing through the centers of the lenses m15, m25, m35, m45 and m55, and crossing the curves SL1 to SL5. Symbol SS6 indicates a curve passing through the centers of the lenses m16, m26, m36, m46 and m56, and crossing the curves SL1 to SL5. Symbol SS7 indicates a curve passing through the centers of the lenses m17, m27, m37, m47 and m57, and crossing the curves SL1 to SL5.

In FIG. 18A, although the lens size (lens diameter) is not constant, the scanning line pitch $P_{scan}$ and the lens pitch $P_{lens}$ may be defined as described above. In this case, the scanning line pitch and the lens pitch are both constant. Accordingly, the micro-lens array illustrated in FIG. 18A is scanned so as to satisfy the conditions of $W_{beam} \geq P_{scan}$ and $P_{lens} \geq P_{scan}$, thereby controlling against occurrence of a moire phenomenon.

In the micro-lens array illustrated in FIG. 18B, the centers of multiple lenses, as arranged along the main-scanning direction, are on curves convex toward one side (lower side of the page of FIG. 18B) in the sub-scanning direction, which are symmetrical with respect to the center in the main-scanning direction. The curvatures of (five in FIG. 18B) curves SL1 to SL5, as arranged along the sub-scanning direction, are constant with respect to the sub-scanning direction. That is, the curvatures of curves SL1 to SL5 are the same. The curves SL1 to SL5 may also be regarded as scanning lines. The centers of the multiple lenses, as arranged along the sub-scanning direction with respect to any of the positions in the main-scanning direction, are on the same straight line.

In FIG. 18B, symbol SS1 indicates a straight line passing through the centers of the lenses m11, m21, m31, m41 and m51 and crossing the curves SL1 to SL5. Symbol SS2 indicates a straight line passing through the centers of the lenses m12, m22, m32, m42 and m52, and crossing the curves SL1 to SL5. Symbol SS3 indicates a straight line passing through the centers of the lenses m13, m23, m33, m43 and m53, and crossing the curves SL1 to SL5. Symbol SS4 indicates a straight line passing through the centers of the lenses m14, m24, m34, m44 and m54, and crossing the curves SL1 to SL5. Symbol SS5 indicates a straight line passing through the centers of the lenses m15, m25, m35, m45 and m55, and crossing the curves SL1 to SL5. Symbol SS6 indicates a straight line passing through the centers of the lenses m16, m26, m36, m46 and m56, and crossing the curves SL1 to SL5. Symbol SS2 indicates a straight line passing through the centers of the lenses m12, m22, m32, m42 and m52, and crossing the curves SL1 to SL5.

In FIG. 18B, the scanning line pitch $P_{scan}$ and the lens pitch $P_{lens}$ may also be defined as described above. In this case, the lens size (lens diameter), the scanning line pitch and the lens pitch are all constant. Accordingly, the micro-lens array illustrated in FIG. 18B is scanned so as to satisfy the conditions of $W_{beam} \geq P_{scan}$ and $P_{lens} \geq P_{scan}$, thereby controlling against occurrence of a moire phenomenon.

Further, a micro-lens array with a non-parallel lens arrangement that differs from those in FIGS. 18A and 18B will be described with reference to FIGS. 19A to 19C and FIGS. 20A to 20C.

In FIGS. 19A to 19C, a line extending in the lateral direction on the optical plate 301 is a scanning line 3011, and a line extending in the vertical direction is a line 3012 crossing the scanning line 3011.

In FIG. 19A, each scanning line 3011 on the micro-lens array is curved to form a convex shape toward one side (lower side of the page of FIG. 19A) in the sub-scanning direction, which is a curve symmetrical with respect to the center (Y axis) in the main-scanning direction (X direction). In FIG. 19A, the scanning line pitch $P_{scan}$ may also be defined as described above. In this case, the scanning line pitch is constant.

In FIG. 19B, the scanning line 3011 at the center of the sub-scanning direction (Y direction) on the micro-lens array is a straight line parallel to the main-scanning direction (X direction). Other scanning lines 3011 are curved to form a convex shape toward the center (X axis) of the sub-scanning direction, each of which is a curve symmetrical with respect to the center (Y axis) of the main-scanning direction (X direction). In FIG. 19B, the scanning line pitch $P_{scan}$ may also be defined as described above. In this case, the scanning line pitch is constant.

In FIG. 19C, the scanning line 3011 at the center of the sub-scanning direction (Y direction) on the micro-lens array is a straight line parallel to the main-scanning direction (X direction). Other scanning lines 3011 are straight lines gradually inclined from one side in the main scanning direction (X direction) (left side of the page of FIG. 19C) to the other side (right side of the page of FIG. 19C) toward the X axis. In FIG. 19C, the scanning line pitch $P_{scan}$ may also be defined as described above. In this case, the scanning line pitch is constant.

FIGS. 20A to 20C are drawings illustrating lens arrangement examples (nonparallel arrangement) of micro-lens arrays scanned with scanning lines illustrated in FIGS. 19A to 19C, respectively. In FIGS. 20A to 20C, the lens pitch $P_{lens}$ may also be defined as described above. Further, in FIGS. 20A to 20C, any of the lens pitches in the sub-scanning direction is constant. Accordingly, the micro-lens arrays illustrated in FIGS. 20A to 20C are scanned so as to satisfy the conditions of $W_{beam} \geq P_{scan}$ and $P_{lens} \geq P_{scan}$, thereby controlling against occurrence of a moire phenomenon.

Although the description has been made with respect to controlling against occurrence of a moire phenomenon composed of the stripe pattern extending in the main-scanning direction, a moire phenomenon composed of a striped pattern extending in the sub-scanning direction may also occur based on the same principle.

Hence, in order to manage such a moire phenomenon with a striped pattern extending in the sub-scanning direction, it is preferable to satisfy the following conditions. That is, as illustrated in FIG. 21, when $WX_{beam}$ represents a beam spot diameter in the main-scanning direction on the micro-lens array, $PX_{scan}$ represents a pitch (center-to-center interval) of the beam spots 302 adjacent in the main-scanning direction, and $PX_{lens}$ represents a lens pitch (lens arrangement pitch) in the main-scanning direction, it is preferable to satisfy the conditions of $WX_{beam} \geq PX_{scan}$ and $PX_{lens} \geq PX_{scan}$; that is, the beam spots 302 adjacent in the main-scanning direction on respective lenses have a predetermined amount or more of an overlapping portion. With this configuration, it is possible to control against occurrence of a moire phenomenon, which is composed of a striped pattern extending in the sub-scanning direction, based on the same principle as in the case of controlling against occurrence of a moire phenomenon composed of a striped pattern extending in the main-scanning direction. Further, when $WX_{lens}$ represents a width of the micro optical element 300 in the sub-scanning direction, it is preferable to satisfy the condition of $WX_{lens} \geq PX_{scan}$. Note that in FIG. 21, the condition is represented by $WX_{lens} = PX_{lens}$.

Note that the discussion about the case where the screen 30 has the micro-lens array as the optical element array as described above may be applied to a case where the screen 30 has a micro-mirror array acting as an optical element array. In the case where the screen 30 includes a micro-mirror array, it is necessary to change the layout for the optical system of an HUD device as illustrated in FIG. 1. For example, it is possible to omit the scanning mirror 20 and arrange a micro-mirror array on the light path between the light deflector 15 and the concave mirror 40. Further, it is possible to arrange, instead of the scanning mirror 20, a lens for making the light that has been deflected by the light deflector 15 to become approximately parallel light, and to arrange a micro-mirror array between the lens and the concave mirror 40.

In view of the first aspect, the HUD device 100 according to the present embodiment described above is a display device that includes an image forming unit including a light-scanning device 10 configured to two-dimensionally scan an optical element array with light in a main-scanning direction and in a sub-scanning direction to form an image, the optical element array having a plurality of micro optical elements 300 (optical elements); and a concave mirror 40 (light projecting unit) configured to project light for forming the image from the image forming unit.

In the display device, a beam spot diameter in the sub-scanning direction on the optical element array and an arrangement pitch of micro optical elements 300 in the sub-scanning direction on the optical element array are equal to or greater than a scanning line pitch on the optical element array. Note that a "scanning line pitch" refers to the maximum interval between adjacent scanning lines with respect to a position in the main-scanning direction on the optical element array when the scanning lines are not parallel to each other, whereas the "scanning line pitch" refers to the interval between adjacent scanning lines when the scanning lines are parallel to each other.

Further, in view of the second aspect, the HUD device 100 according to the present embodiment described above is a display device that includes a light source device 11 (light source unit);

a light deflector 15 configured to deflect light from the light source device 11;

an optical element array configured to be two-dimensionally scanned in a main-scanning direction and in a sub-scanning direction with light via the light deflector 15, the optical element array having a plurality of micro optical elements 300 (optical elements); and a concave mirror 40 (light projecting unit) configured to project light received via the optical element array.

In the display device, a beam spot diameter in the sub-scanning direction on the optical element array and an arrangement pitch of micro optical elements 300 in the sub-scanning direction on the optical element array are equal to or greater than a scanning line pitch on the optical element array.

According to the HUD device 100 of the present embodiment, it is possible to control against occurrence of a moire phenomenon (striped pattern extending in the main-scanning direction) caused by the arrangement of the micro optical elements 300 and the scanning line pitch.

Further, a width of the micro optical element 300 in the sub-scanning direction is preferably equal to or greater than the scanning line pitch. In this case, it is possible to allow a plurality of scanning lines to cross over each of the micro optical elements 300, to improve luminance on the micro optical elements 300, and to reduce luminance unevenness in the entire optical element array.

Further, when the beam spot diameter is $W_{beam}$, the arrangement pitch is $P_{lens}$, the scanning line pitch is $P_{scan}$, the pixel density in the sub-scanning direction of the HUD device 100 is $Y_{cpd}$, the moire frequency is $f_{moire}$, and the moire contrast is $C_{moire}$, it is preferable that the following formulas are established: $f_{moire} = Y_{cpd}(P_{lens} - P_{scan})/2P_{scan}$, $C_{moire} = -0.9 \times W_{beam}/P_{scan} + 1.6$, $0.5/5.05 \times \exp(-0.138 f_{more}) \times (1.0 - \exp(-0.1) f_{moire}) \geq C_{moire}$.

Further, when the arrangement pitch is $P_{lens}$, the scanning line pitch is $P_{scan}$, and the pixel density in the sub-scanning direction of the HUD device 100 is $Y_{cpd}$, values for $Y_{ppd}$, $P_{lens}$ and $P_{scan}$ may be set such that the moire frequency $f_{moire}$ obtained by $f_{moire} = Y_{cpd}(P_{lens} - P_{scan})/2P_{scan}$ is 10 cpd or more.

Further, when the beam spot diameter is $W_{beam}$, the arrangement pitch is $P_{lens}$, the scanning line pitch is $P_{scan}$, and the pixel density in the sub-scanning direction of the HUD device 100 is $Y_{cpd}$, values for $Y_{cpd}$, $P_{lens}$, $P_{scan}$, and $W_{beam}$ may be set such that the moire frequency $f_{moire}$ obtained by $f_{moire} = Y_{cpd}(P_{lens} - P_{scan})/2P_{scan}$ is less than 10 cpd, and the moire contrast $C_{moire}$ obtained by $C_{moire} = -0.9 \times W_{beam}/P_{scan} + 1.6$ is 0.5 or less.

Further, it is preferable that the optical centers of any sets of micro optical elements 300 adjacent to each other in the main-scanning direction in the optical element array be shifted in the sub-scanning direction (see FIG. 11D and FIGS. 18A to 20C).

In this case, since the boundary between the lenses adjacent in the sub-scanning direction is shifted in the sub-scanning direction, occurrence of a moire phenomenon in the sub-scanning direction may be further controlled against.

Further, it is preferable that each of the plurality of micro optical elements 300 have a hexagonal shape in a plan view, and that the plurality of micro optical elements 300 are arranged in a honeycomb structure (see FIGS. 10, 11C, (D), and 20A to 20C).

Further, it is preferable that the beam spot diameter in the main-scanning direction on the optical element array and the arrangement pitch in the main-scanning direction of the micro optical elements 300 in the optical element array be equal to or greater than a center-to-center interval between the beam spots adjacent in the main-scanning direction on the optical element array.

In this case, it is possible to control against occurrence of a moire phenomenon (striped pattern extending in the sub-scanning direction) due to the arrangement of the micro optical elements 300 and the center-to-center interval between the beam spots adjacent in the main-scanning direction.

Further, it is preferable that the width of the micro optical element 300 in the sub-scanning direction be equal to or greater than the above-described center-to-center interval. In this case, it is possible to position overlapped portions of the beam spots adjacent in the main-scanning direction on the respective micro optical elements 300, to improve the luminance on the micro optical elements 300, and to reduce luminance unevenness in the entire optical element array.

Further, according to a vehicle apparatus (object apparatus) that includes a vehicle (object) having a front windshield 50 (transreflective member); and a HUD device 100 installed in the vehicle and configured to project light to the front windshield 50, it is possible to provide useful information to a driver (viewer) with high quality image quality.

Further, a display method of this embodiment, includes forming an image by two-dimensionally scanning an optical element array (optical element array) including a plurality of micro optical elements 300 (optical elements) in a main-scanning direction and in a sub-scanning direction with light; and projecting the light forming the image to display an image, wherein the optical element array is two-dimensionally scanned such that a beam spot diameter in the sub-scanning direction on the optical element array and an arrangement pitch of micro optical elements 300 in the sub-scanning direction on the optical element array are equal to or greater than a scanning line pitch on the optical element array.

In this case, it is possible to control against occurrence of a moire phenomenon due to the arrangement of the micro optical elements 300 and the scanning line pitch.

Note that the HUD device 100 according to the above-described embodiment is provided with a flat screen 30; however, the HUD device 100 according to the above-described embodiment may employ a curved screen so as to be convex toward an outgoing surface along the main scanning direction. In this case, it is possible to make a length of the light path from the light deflector 15 to the screen to be substantially constant in an in-plane direction of the screen, even in a configuration of omitting the scanning mirror 20 to directly guide light that has been deflected by the light deflector 15 to the screen or in a configuration of having a flat mirror as the scanning mirror 20 (in FIG. 1, the scanning mirror 20 is a convex mirror).

In the HUD device according to the above-described embodiment, the "light projecting unit" is configured with the concave mirror 40; however, the light projecting unit is not limited to this configuration. For example, the light projecting unit may be configured with a convex mirror, or the light projecting unit may be configured with a curved mirror (i.e., a concave or convex mirror) and a turning mirror disposed between the curved mirror and the screen 30.

Furthermore, an LD (i.e., an edge emitting laser) is employed as a light source in the above embodiment; however, another type of laser such as a surface emitting laser may be employed.

Furthermore, the HUD device in the above-described embodiment is configured to manage color images; however, the HUD device may be configured to manage monochrome images.

Furthermore, the transreflective member is not limited to a front windshield of a vehicle, and may be a side window or a rear windshield, for example. That is, the transflective member is preferably a window member (windshield) for a viewer (driver) to visually check the outside the vehicle, and is preferably provided on a vehicle on which the viewer (driver) visually recognizing the virtual image is on board.

Furthermore, the description in the above embodiment is given with an example of a HUD device mounted on a car, etc. This indicates that the HUD device is preferably mounted on a movable object such as a vehicle, an aircraft, a vessel or a robot. For example, a vehicle used as an "object apparatus" in the present invention is not limited to a four-wheeled car, and may be a (two-wheeled) motorcycle, a (three-wheeled) motor tricycle, etc. In such cases, a vehicle needs to be equipped with a windshield or a combiner as a transreflective member. In addition, a power source of a vehicle may be an engine, a motor or combination of an engine and a motor, etc.

Moreover, the application of the display device according to the present embodiment is not limited to a HUD device; the display device according to the present embodiment may also be applied to a device for displaying an image (including a virtual image) such as a projector, a prompter or a head-mounted display.

That is, the display device according to the present embodiment may be attached to or mounted on an object such as a moving object, a human body or a motionless object (including an object that is conveyable and an object that is permanently installed).

For example, an optical system of the HUD device 100 may be used when the display device according to the present embodiment is applied to a projector. Specifically, light emitted from a light source device 11 and received via a light deflector 15 and a screen 30 may be directly projected onto a projection target such as a projection screen, a table, a floor or a ceiling, or such light received via the screen 30 may be projected onto the projection target via the optical system including a lens or a mirror.

Furthermore, the specific numerical values, shapes, etc., used in the above-described embodiment are examples and therefore changeable, as needed, without departing from the scope of the present invention.

The following describes a thinking process of the inventors, which has led to the invention of the above-described embodiment.

Conventionally, in a scanning type HUD device configured to form an intermediate image by scanning a micro-lens array with light, there is known in the art a technique of appropriately controlling a micro-lens diameter and a beam diameter to reduce interference noise due to laser light having a high coherence property.

For example, the HUD device disclosed in [PTL 1] (Japanese Unexamined Patent Application Publication No. 2014-170213), for example, reduces interference noise caused by laser light having a high coherence property by differentiating the amount of sag from the apex of a curved surface to the boundary between adjacent optical elements arranged in a grid pattern on a screen member.

However, in a case where intervals (scanning line pitch) between the scanning lines, which are rendered by the optical scanning unit on the regular optical element pattern in accordance with the grid-like arrangement, are constant, a moire phenomenon due to the optical element pattern interval and the scanning line interval may occur to lower the image quality.

Therefore, the inventors of the present invention developed the above-described embodiment in order to provide a HUD device capable of controlling against a moire phenomenon by appropriately controlling arrangement pitch, scanning line pitch, and beam spot diameter of micro-optical elements.

REFERENCE SIGNS LIST 11 light source device (light source unit)
15 light deflector
30 screen (member including optical element array)
40 concave mirror (light projecting unit)
50 front windshield (transreflective member)
100 HUD device (display device)
300 micro optical element (optical element)

The present application is based on and claims the benefit of priority of Japanese Priority Application No. 2017-053554 filed on Mar. 17, 2017, and Japanese Priority Application No. 2018-004108 filed on Jan. 15, 2018, the entire contents of which are hereby incorporated herein by reference.

The invention claimed is:

1. A display device comprising:
a light source unit;
a light deflector configured to deflect light from the light source unit;
an optical element array including a plurality of optical elements;
a light deflector configured to deflect light from the light source unit to two-dimensionally scan the optical element array in a main-scanning direction and a sub-scanning direction; and
a light projecting unit configured to project light received via the optical element array, wherein
each of a beam spot diameter in the sub-scanning direction on the optical element array and an arrangement pitch of the optical elements in the sub-scanning direction on the optical element array is equal to or greater than a scanning line pitch on the optical element array, and
when the arrangement pitch is Plens, the scanning line pitch defines as an interval between the adjacent scanning lines at a position with respect to the main-scanning direction where the interval becomes widest between the adjacent scanning lines on the optical element array is Pscan, and the pixel density in the sub-scanning direction of the display device is Ycpd, respective values for Ycpd, Plens, and Pscan are set such that the moiré frequency fmoiré obtained by fmoiré=Ycpd(Plens−Pscan)/2Pscan is 10 cycles per degree or more.

2. The display device according to claim 1, wherein a width of the optical element in the sub-scanning direction is equal to or greater than the scanning line pitch.

3. The display device according to claim 1, wherein when the beam spot diameter is $W_{beam}$, and a moiré contrast is $C_{moire}$, the following formulas are established:

$f_{moire} = Y_{cpd}(P_{lens} - P_{scan})/2P_{scan};$ $C_{moire} = -0.9 \times W_{beam}/P_{scan} + 1.6;$ and $0.5/5.05\text{Done} \times \exp(-0.138 f_{moire}) \times (1.0 - \exp(-0.1)$
$f_{moire}) \geq C_{moire}.$ 4. The display device according to claim 1, wherein when the beam spot diameter is $W_{beam}$, the moiré contrast $C_{moire}$ obtained by $C_{moire} = -0.9 \times W_{beam}/P_{scan} + 1.6$ is 0.5 or less.

5. The display device according to claim 1, wherein optical centers of the optical elements adjacent to each other in the main-scanning direction in the optical element array are shifted in the sub-scanning direction.

6. The display device according to claim 1, wherein each of the plurality of optical elements has a hexagonal shape in plan view, and the plurality of optical elements are arranged in a honeycomb structure.

7. The display device according to claim 1, wherein each of the beam spot diameter in the main-scanning direction on the optical element array and the arrangement pitch in the main-scanning direction of the optical elements in the optical element array is equal to or greater than a center-to-center interval between beam spots adjacent in the main-scanning direction on the optical element array.

8. The display device as claimed in claim 7, wherein a width of the optical element in the main-scanning direction is equal to or greater than the center-to-center interval.

9. An object apparatus comprising:
an object provided with a transreflective member and
the display device according to claim 1 mounted on the object and configured to project light onto the transreflective member.

10. The object apparatus according to claim 9, wherein the object is a movable object.

11. A display method comprising:
forming an image by two-dimensionally scanning an optical element array including a plurality of optical elements in a main-scanning direction and in a sub-scanning direction; and
projecting the image formed by the two-dimensional scanning of the optical element array to display a projected image, wherein
each of a beam spot diameter in the sub-scanning direction on the optical element array and an arrangement pitch of the optical elements in the sub-scanning direction on the optical element array is equal to or greater than a scanning line pitch on the optical element array, and
when the arrangement pitch is Plens, the scanning line pitch defines as an interval between the adjacent scanning lines at a position with respect to the main-scanning direction where the interval becomes widest between the adjacent scanning lines on the optical element array is Pscan, and the pixel density in the sub-scanning direction of the display device is Ycpd, respective values for Ycpd, Plens, and Pscan are set such that the moire frequency fmoiré obtained by fmoiré=Ycpd(Plens−Pscan)/2Pscan is 10 cycles per degree or more.

* * * * *